(12) United States Patent
Yeh et al.

(10) Patent No.: US 11,940,597 B2
(45) Date of Patent: Mar. 26, 2024

(54) IMAGE CAPTURING OPTICAL LENS SYSTEM, IMAGING APPARATUS AND ELECTRONIC DEVICE

(71) Applicant: LARGAN PRECISION CO., LTD., Taichung (TW)

(72) Inventors: Kuan-Ting Yeh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 322 days.

(21) Appl. No.: 17/376,250

(22) Filed: Jul. 15, 2021

(65) Prior Publication Data
US 2022/0244495 A1  Aug. 4, 2022

(30) Foreign Application Priority Data
Feb. 1, 2021  (TW) ................. 110103723

(51) Int. Cl.
*G02B 13/00*  (2006.01)
*G02B 9/34*   (2006.01)

(52) U.S. Cl.
CPC ............. *G02B 13/004* (2013.01); *G02B 9/34* (2013.01)

(58) Field of Classification Search
CPC .......... G02B 15/144; G02B 15/144109; G02B 15/144111; G02B 15/144509; G02B 15/144511; G02B 13/004; G02B 9/34
See application file for complete search history.

(56) References Cited

U.S. PATENT DOCUMENTS

| | | | |
|---|---|---|---|
| 4,484,802 A | 11/1984 | Kikuchi | |
| 7,821,725 B2 | 10/2010 | Sato et al. | |
| 10,139,594 B2 | 11/2018 | Lin et al. | |
| 10,306,031 B2 | 5/2019 | Tseng et al. | |
| 2002/0181121 A1* | 12/2002 | Kawakami | G02B 9/34 359/689 |
| 2010/0046096 A1 | 2/2010 | Hirao et al. | |
| 2017/0235109 A1 | 1/2017 | Shin | |
| 2021/0063686 A1 | 3/2021 | Kim et al. | |
| 2022/0206274 A1 | 6/2022 | Huh et al. | |

FOREIGN PATENT DOCUMENTS

| | | |
|---|---|---|
| CN | 101661148 A | 3/2010 |
| CN | 110109234 A | 8/2019 |
| CN | 110716299 A | 1/2020 |
| CN | 110908097 A | 3/2020 |
| CN | 111142237 A | 5/2020 |
| CN | 211528803 U | 9/2020 |

(Continued)

*Primary Examiner* — Joseph P Martinez
(74) *Attorney, Agent, or Firm* — McClure, Qualey & Rodack, LLP

(57) ABSTRACT

An image capturing optical lens system includes four lens elements, which are, in order from an object side to an image side along an optical path, a first lens element, a second lens element, a third lens element and a fourth lens element. The first lens element has an object-side surface being convex in a paraxial region thereof. The third lens element with positive refractive power has an object-side surface being convex in a paraxial region thereof and an image-side surface being concave in a paraxial region thereof. The fourth lens element has negative refractive power.

30 Claims, 30 Drawing Sheets

(56) References Cited

FOREIGN PATENT DOCUMENTS

| | | | |
|---|---|---|---|
| CN | 111736313 | A | 10/2020 |
| CN | 112099209 | A | 12/2020 |
| CN | 112230393 | A | 1/2021 |
| JP | 2011095301 | A | 5/2011 |
| WO | 2022000824 | A1 | 1/2022 |
| WO | 2022061676 | A1 | 3/2022 |

* cited by examiner

IMAGE CAPTURING OPTICAL LENS SYSTEM, IMAGING APPARATUS AND ELECTRONIC DEVICE

RELATED APPLICATIONS

This application claims priority to Taiwan Application Serial Number 110103723, filed Feb. 1, 2021, which is herein incorporated by reference.

BACKGROUND

Technical Field

The present disclosure relates to an image capturing optical lens system and an imaging apparatus. More particularly, the present disclosure relates to an image capturing optical lens system and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a need for an image capturing optical lens system that can overcome the aforementioned difficulties.

SUMMARY

According to one aspect of the present disclosure, an image capturing optical lens system includes four lens elements, the four lens elements being, in order from an object side to an image side along an optical path, a first lens element, a second lens element, a third lens element and a fourth lens element. The first lens element has an object-side surface being convex in a paraxial region thereof. The third lens element with positive refractive power has an object-side surface being convex in a paraxial region thereof and an image-side surface being concave in a paraxial region thereof. The fourth lens element has negative refractive power. When an Abbe number of the second lens element is V2, an Abbe number of the third lens element is V3, a focal length of the image capturing optical lens system is f, a curvature radius of an object-side surface of the fourth lens element is R7, a curvature radius of an image-side surface of the fourth lens element is R8, a central thickness of the first lens element is CT1, a central thickness of the second lens element is CT2, and an axial distance between the object-side surface of the first lens element and an image surface is TL, the following conditions are satisfied: 10<V2+V3<70; f/|R7|+f/|R8|<6.0; 0.30<CT1/CT2<3.0; and 0.5<TL/f<1.0.

According to one aspect of the present disclosure, an imaging apparatus includes the image capturing optical lens system of the aforementioned aspect and an image sensor disposed on the image surface of the image capturing optical lens system.

According to one aspect of the present disclosure, an electronic device includes the imaging apparatus of the aforementioned aspect.

According to one aspect of the present disclosure, an image capturing optical lens system includes four lens elements, the four lens elements being, in order from an object side to an image side along an optical path, a first lens element, a second lens element, a third lens element and a fourth lens element. The second lens element has an image-side surface being concave in a paraxial region thereof. The third lens element has an object-side surface being convex in a paraxial region thereof. When an Abbe number of the second lens element is V2, an Abbe number of the third lens element is V3, a focal length of the image capturing optical lens system is f, a curvature radius of the object-side surface of the third lens element is R5, a curvature radius of an image-side surface of the third lens element is R6, a curvature radius of an object-side surface of the fourth lens element is R7, a curvature radius of an image-side surface of the fourth lens element is R8, an axial distance between an object-side surface of the first lens element and the image-side surface of the fourth lens element is Td, an axial distance between the image-side surface of the fourth lens element and an image surface is BL, a sum of all axial distances between adjacent lens elements of the image capturing optical lens system is ΣAT, and an axial distance between the second lens element and the third lens element is T23, the following conditions are satisfied: 10<V2+V3<55; f/|R7|+f/|R8|<6.0; 0.5<Td/BL<2.4; (R5+R6)/(R5−R6)<0.7; and 1.0<ΣAT/T23<1.8.

According to one aspect of the present disclosure, an image capturing optical lens system includes four lens elements, the four lens elements being, in order from an object side to an image side along an optical path, a first lens element, a second lens element, a third lens element and a fourth lens element. The third lens element with positive refractive power has an object-side surface being convex in a paraxial region thereof and an image-side surface being concave in a paraxial region thereof. The fourth lens element has negative refractive power. When an Abbe number of the second lens element is V2, an Abbe number of the third lens element is V3, a focal length of the image capturing optical lens system is f, a curvature radius of an object-side surface of the fourth lens element is R7, a curvature radius of an image-side surface of the fourth lens element is R8, a central thickness of the first lens element is CT1, a central thickness of the second lens element is CT2, a sum of all axial distances between adjacent lens elements of the image capturing optical lens system is ΣAT, an axial distance between the second lens element and the third lens element is T23, and an axial distance between an object-side surface of the first lens element and an image surface is TL, the following conditions are satisfied: 10<V2+V3<55; f/|R7|+f/|R8|<6.0; 0.30<CT1/CT2<2.7; 1.0<ΣAT/T23<2.5; and TL/f<1.40.

DETAILED DESCRIPTION

Figure 1:
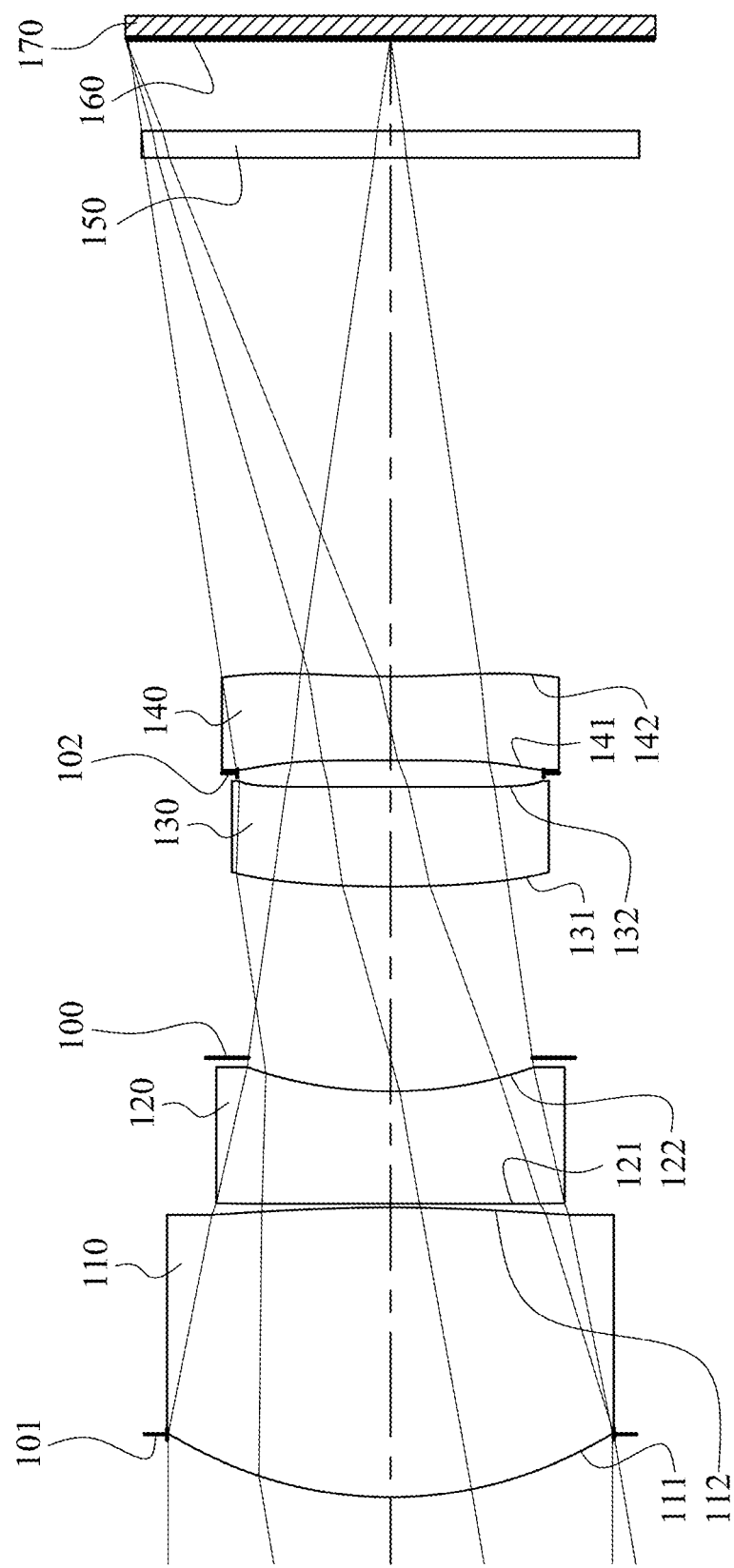
FIG. 1 is a schematic view of an imaging apparatus according to the 1st embodiment of the present disclosure.

The present disclosure provides an image capturing optical lens system, which includes four lens elements, the four lens elements being, in order from an object side to an image side along an optical path, a first lens element, a second lens element, a third lens element and a fourth lens element.

The first lens element can have positive refractive power, so that it is favorable for achieving the requirement of compactness by reducing the total track length of the image capturing optical lens system. The first lens element has an object-side surface being convex in a paraxial region thereof, so that the refractive power of the first lens element can be strengthened.

The second lens element can have negative refractive power so as to balance aberrations generated when reducing the size of the image capturing optical lens system. The second lens element can have an image-side surface being concave in a paraxial region thereof, so that it is favorable for correcting aberrations, such as astigmatism.

The third lens element can have positive refractive power. Therefore, it is favorable for balancing the arrangement of positive refractive power for reducing the total track length of the image capturing optical lens system so as to reduce the sensitivity and increase the yield rate of assembling. The third lens element has an object-side surface being convex in a paraxial region thereof, so that it is favorable for reducing the total track length of the image capturing optical lens system by adjusting the refractive power of the third lens element. The third lens element can have an image-side surface being concave in a paraxial region thereof, so that it is favorable for correcting aberrations of the image capturing optical lens system.

The fourth lens element can have negative refractive power. It is favorable for correcting the light path close to the image surface of the image capturing optical lens system so as to provide a better incident angle on the image surface. The fourth lens element can have an image-side surface being concave in a paraxial region thereof, so that it is favorable for correcting astigmatism thereof. The image-side surface of the fourth lens element can include at least one inflection point in an off-axis region thereof, so that it is favorable for enhancing the variation of lens surface so as to correct off-axis aberrations. Further, the image-side surface of the fourth lens element can include at least one critical point in the off-axis region thereof so as to adjust the surface shape of the fourth lens element and further correct off-axis aberrations.

When an Abbe number of the second lens element is V2, and an Abbe number of the third lens element is V3, the following condition is satisfied: $10 < V2 + V3 < 70$. Therefore, it is favorable for enhancing the correction of chromatic aberrations. Further, the following condition can be satisfied: 10<V2+V3<55. Moreover, the following condition can be satisfied: 15<V2+V3<50.

When a focal length of the image capturing optical lens system is f, a curvature radius of an object-side surface of the fourth lens element is R7, and a curvature radius of the image-side surface of the fourth lens element is R8, the following condition is satisfied: f/|R7|+f/|R8|<6.0. Therefore, it is favorable for avoiding overly large curvature on the lens element on the image side which will produce manufacturing difficulties or optical flare. Further, the following condition can be satisfied: f/|R7|+f/|R8|<5.0. Moreover, the following condition can be satisfied: 0.30<f/|R7|+f/|R8|<4.0.

When a central thickness of the first lens element is CT1, and a central thickness of the second lens element is CT2, the following condition is satisfied: 0.30<CT1/CT2<3.0. Therefore, it is favorable for enhancing the structural strength of the first lens element and the second lens element so as to increase the productivity of the image capturing optical lens system. Further, the following condition can be satisfied: 0.30<CT1/CT2<2.7.

When the focal length of the image capturing optical lens system is f, and an axial distance between the object-side surface of the first lens element and the image surface is TL, the following condition is satisfied: TL/f<2.50. Therefore, it is favorable for providing a telephoto configuration with a shorter total track length. Further, the following condition can be satisfied: TL/f<2.0. Moreover, the following condition can be satisfied: TL/f<1.40. Furthermore, the following condition can be satisfied: TL/f<1.20. Moreover, the following condition can be satisfied: 0.5<TL/f<1.0.

When an axial distance between the object-side surface of the first lens element and the image-side surface of the fourth lens element is Td, and an axial distance between the image-side surface of the fourth lens element and the image surface is BL, the following condition is satisfied: 0.5<Td/BL<4.0. Therefore, it is favorable for ensuring enough space between lens elements and the image surface while sufficiently utilizing the limited space in the image capturing optical lens system. Further, the following condition can be satisfied: 0.5<Td/BL<2.4.

When a curvature radius of the object-side surface of the third lens element is R5, and a curvature radius of the image-side surface of the third lens element is R6, the following condition is satisfied: (R5+R6)/(R5−R6)<0.7. Therefore, it is favorable for arranging the third lens element and the fourth lens element with better imaging quality. Further, the following condition can be satisfied: (R5+R6)/(R5−R6)<−0.50. Moreover, the following condition can be satisfied: −10<(R5+R6)/(R5−R6)<−0.75.

When a sum of all axial distances between adjacent lens elements of the image capturing optical lens system is ΣAT, and an axial distance between the second lens element and the third lens element is T23, the following condition is satisfied: 1.0<ΣAT/T23<2.5. Therefore, it is favorable for arranging other elements between the second lens element and the third lens element while reducing the size of the light beam in the middle portion of the image capturing optical lens system so as to further reduce the overall size. Moreover, the following condition can be satisfied: 1.0<ΣAT/T23<1.8.

When a maximum distance between an optical effective region of the object-side surface of the first lens element and the optical axis is Y11, and a maximum image height of the image capturing optical lens system is ImgH, the following condition is satisfied: 0.60<Y11/ImgH<1.20. Therefore, it is favorable for controlling the size of the light beam so as to avoid an effective diameter of any single lens element being overly large which will affect the compactness of the image capturing optical lens system.

When the focal length of the image capturing optical lens system is f, a focal length of the first lens element is f1, a focal length of the second lens element is f2, a focal length of the third lens element is f3, and a focal length of the fourth lens element is f4, the following condition is satisfied: 2.0<(|f/f1|+|f/f2|)/(|f/f3|+|f/f4|)<8.0. Therefore, it is favorable for ensuring sufficient refractive power for light convergence on the image surface while miniaturizing the lens elements on the object side of the image capturing optical lens system.

When the maximum image height of the image capturing optical lens system is ImgH, and an entrance pupil diameter of the image capturing optical lens system is EPD, the following condition is satisfied: 0.30<ImgH/EPD<0.80. Therefore, it is favorable for controlling the size of the light beam so as to avoid excessively a large effective diameter of any single lens element which will affect the compactness of the image capturing optical lens system.

When the focal length of the image capturing optical lens system is f, a curvature radius of the object-side surface of the first lens element is R1, and a curvature radius of the image-side surface of the second lens element is R4, the following condition is satisfied: 6.0<(f/R1)+(f/R4). Therefore, it is favorable for enhancing image quality by correcting aberrations.

When the focal length of the second lens element is f2, and the focal length of the fourth lens element is f4, the following condition is satisfied: 0<f2/f4<1.25. Therefore, it is favorable for ensuring sufficient refractive power for light focusing on the image surface with a compact arrangement of lens elements on the image side of the image capturing optical lens system.

When the focal length of the image capturing optical lens system is f, and the maximum image height of the image capturing optical lens system is ImgH, the following condition is satisfied: 4.0<f/ImgH. Therefore, it is favorable for providing a longer focal length in a telephoto configuration of the image capturing optical lens system. Moreover, the following condition can be satisfied: 4.50<f/ImgH<10.

When half of a maximum field of view of the image capturing optical lens system is HFOV, the following condition is satisfied: tan(2×HFOV)<0.60.

Therefore, it is favorable for enhancing the telephoto arrangement with a small field of view.

When a minimum Abbe number of the lens elements of the image capturing optical lens system is V min, the following condition is satisfied: 10<V min<20. Therefore, it is favorable for enhancing the correction of chromatic aberration.

When an Abbe number of one of the lens elements is Vi, and a refractive index of the lens element is Ni, at least one of the lens elements of the image capturing optical lens system satisfies the following condition: 5.0<Vi/Ni<12.0, wherein i=1, 2, 3, 4. Therefore, it is favorable for correcting chromatic aberration.

The image capturing optical lens system can further include at least one reflective element. Therefore, it is favorable for enhancing the flexibility of space arrangement in the image capturing optical lens system. The reflective element can be located on an object side of the first lens element along the optical path and can have refractive power. One surface of the reflective element facing towards an imaged object is convex in a paraxial region thereof.

Therefore, the arrangement of the refractive power and the aberration correction can be enhanced, and the image capturing optical lens system can have a convex outside appearance.

The reflective element can be made of plastic material. When a glass transition temperature of a material of the reflective element is Tgp, and a refractive index of the reflective element is Np, the following condition is satisfied: 92.5<Tgp/Np<100. Thus, it is favorable for increasing the yield rate by reducing the manufacturing difficulty of the reflective element.

The image capturing optical lens system can include a light blocking element having a non-circular inner hole. Therefore, it is favorable for shielding the stray light so as to enhance the image quality.

Each of the aforementioned features of the image capturing optical lens system can be utilized in various combinations for achieving the corresponding effects.

According to the image capturing optical lens system of the present disclosure, the lens elements thereof can be made of glass or plastic materials. When the lens elements are made of glass materials, the distribution of the refractive power of the image capturing optical lens system may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the image capturing optical lens system. Therefore, the total track length of the image capturing lens assembly can also be reduced. The aspheric surfaces may be formed by a plastic injection molding method, a glass molding method or other manufacturing methods.

According to the image capturing optical lens system of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the image capturing optical lens system so as to reduce extra red light or infrared lights, or the additives can have the absorption ability for lights in a wavelength range of 350 nm-450 nm in the image capturing optical lens system so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method.

According to the image capturing optical lens system of the present disclosure, when a surface of the lens element is aspheric, it indicates that entire optical effective region of the surface of the lens element or a part thereof is aspheric.

According to the image capturing optical lens system of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the image capturing optical lens system of the present disclosure, if the lens element has positive refractive power or negative refractive power, or the focal length of the lens element, all can be referred to the refractive power, or the focal length, in the paraxial region of the lens element.

According to the image capturing optical lens system of the present disclosure, a critical point is a non-axial point of the lens surface where its tangent is perpendicular to the optical axis; an inflection point is a point on a lens surface with a curvature changing from positive to negative or from negative to positive.

According to the image capturing optical lens system of the present disclosure, the image surface thereof, based on the corresponding image sensor, can be flat or curved. In particular, the image surface can be a concave curved surface facing towards the object side. Furthermore, the image capturing optical lens system of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 26A:
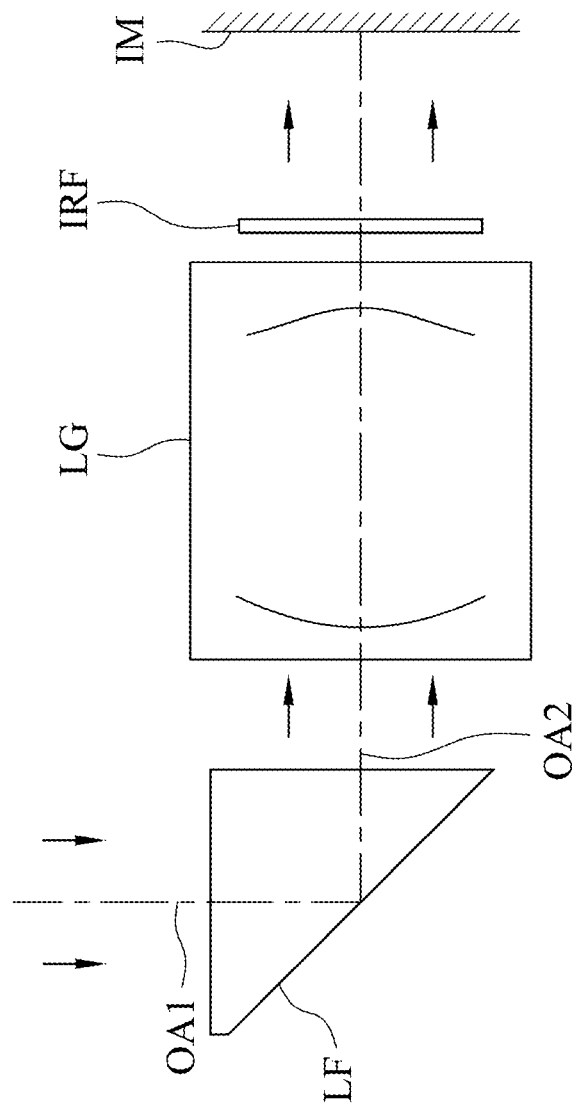
FIG. 26A is a schematic view of an arrangement of a light path folding element in the image capturing optical lens system of the present disclosure.
Figure 26B:
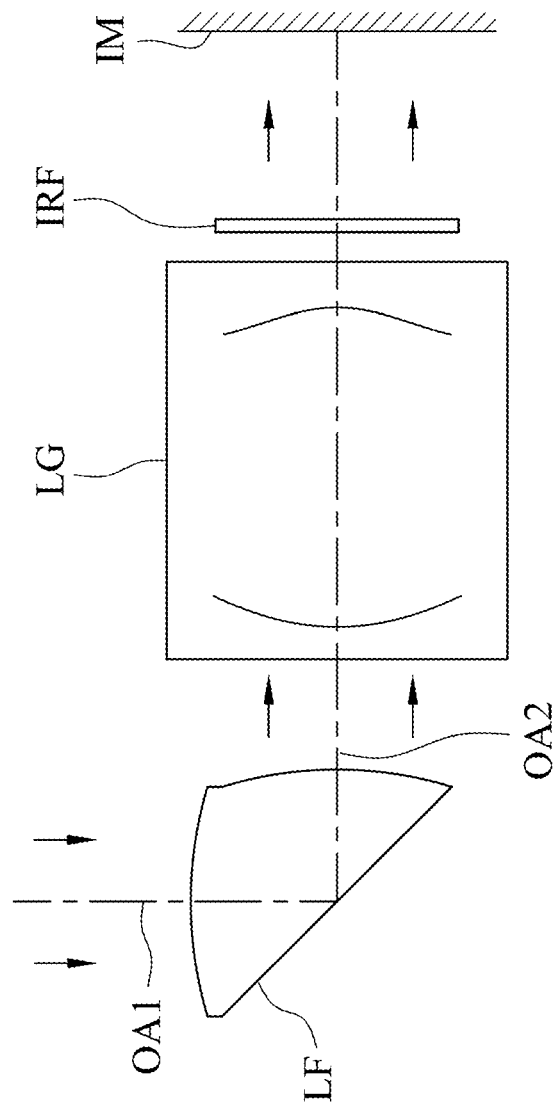
FIG. 26B is a schematic view of another arrangement of the light path folding element in the image capturing optical lens system of the present disclosure.
Figure 26C:
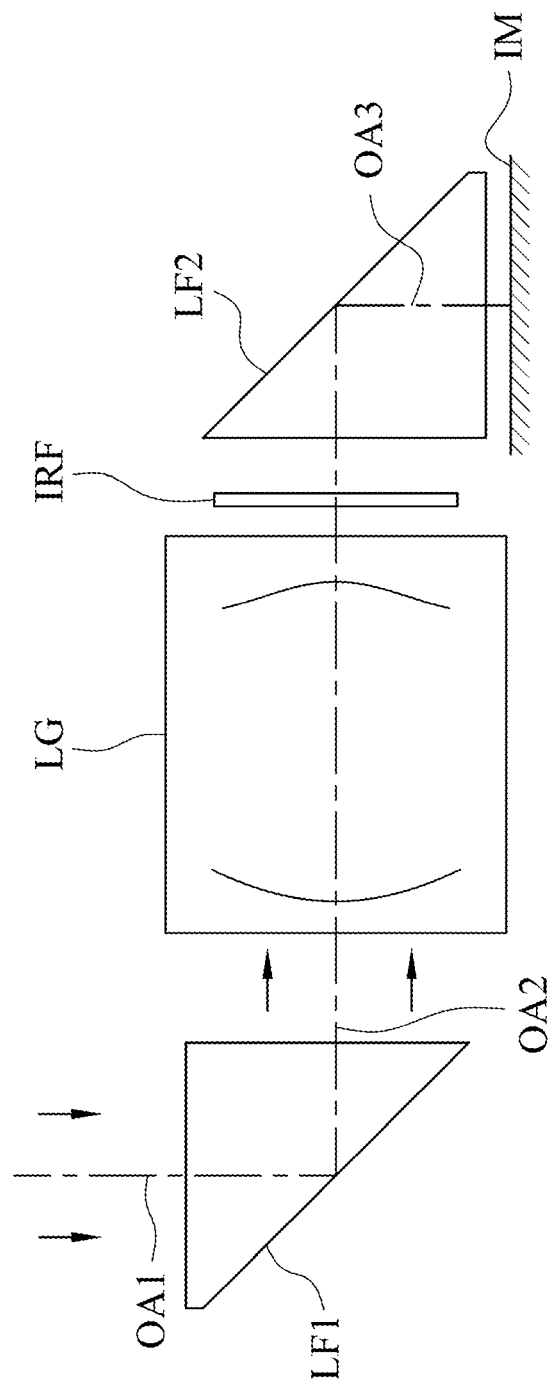
FIG. 26C is a schematic view of an arrangement of two light path folding elements in the image capturing optical lens system of the present disclosure.
Figure 26D:
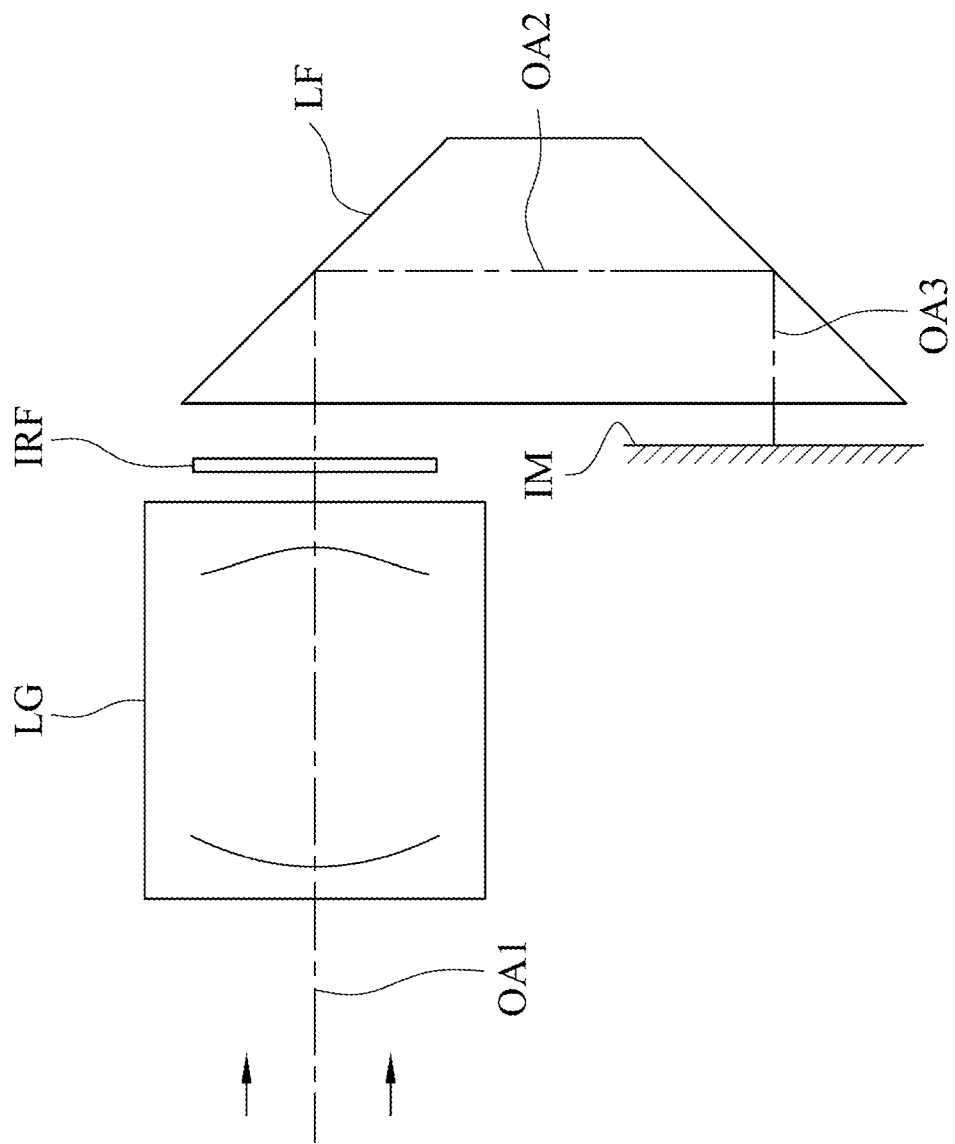
FIG. 26D is a schematic view of another arrangement of the light path folding element in the image capturing optical lens system of the present disclosure.

According to the image capturing optical lens system of the present disclosure, at least one element with light path folding function can be selectively disposed between the imaged object and the image surface, such as a prism or a mirror, etc. Therefore it is favorable for providing high flexible space arrangement of the image capturing optical lens system, so that the compactness of the electronic device would not be restricted by the optical total track length of the image capturing optical lens system. FIG. 26A is a schematic view of an arrangement of a light path folding element LF in the image capturing optical lens system of the present disclosure. FIG. 26B is a schematic view of another arrangement of the light path folding element LF in the image capturing optical lens system of the present disclosure. As shown in FIGS. 26A and 26B, the image capturing optical lens system includes, in order from an imaged object (not shown in drawings) to an image surface IM, a first optical axis OA1, the light path folding element LF and a second optical axis OA2, a lens group LG of the image capturing optical lens system and an IR-cut filter IRF, wherein the light path folding element LF can be disposed between the imaged object and a lens group LG of the image capturing optical lens system. The differences between FIG. 26A and FIG. 26B are, the object-side surface and the image-side surface of the light path folding element LF in FIG. 26A are both planar, and the object-side surface and the image-side surface of the light path folding element LF in FIG. 26B are both convex. Moreover, FIG. 26C is a schematic view of an arrangement of two light path folding elements LF1, LF2 in the image capturing optical lens system of the present disclosure. As shown in FIG. 26C, the image capturing optical lens system includes, in order from an imaged object (not shown in drawings) to an image surface IM, a first optical axis OA1, the light path folding element LF1, a second optical axis OA2, a lens group LG of the image capturing lens assembly, an IR-cut filter IRF, the light path folding element LF2 and a third optical axis OA3, wherein the light path folding element LF1 is disposed between the imaged object and the lens group LG of the image capturing lens assembly, and the light path folding element LF2 is disposed between the IR-cut filter IRF and the image surface IM. The image capturing lens assembly can also be selectively disposed with three or more light path folding element, the type, amount and location of the light path folding element will not be limited to the present disclosure. Further, FIG. 26D is a schematic view of another arrangement of the light path folding element LF in the image capturing optical lens system of the present disclosure. In FIG. 26D, the image capturing optical lens system includes, in order from an imaged object (not shown in drawings) to an image surface IM, a first optical axis OA1, a lens group LG of the image capturing lens assembly, an IR-cut filter IRF, the light path folding element LF, a second optical axis OA2 and a third optical axis OA3, wherein the light path folding element LF can be disposed between the IR-cut filter IRF and the image surface IM, and the incident light can be folded by the light path folding element LF along the direction of the first optical axis OA1 to the direction of the second optical axis OA2, and then folded to the direction of the third optical axis OA3 to the image surface IM.

Furthermore, according to the image capturing optical lens system of the present disclosure, the image capturing optical lens system can include at least one stop, such as an aperture stop, a glare stop or a field stop, for eliminating stray light and thereby improving image resolution thereof.

According to the image capturing optical lens system of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the image capturing optical lens system and the image surface can be obtained, and thereby obtains a telecentric effect and improves the image-sensing efficiency of the image sensor, such as CCD or CMOS. The middle stop is favorable for enlarging the field of view of the image capturing optical lens system and thereby provides a wider field of view for the same.

According to the image capturing optical lens system of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the image capturing optical lens system according to the present disclosure, so as to moderate the image quality by changing f-number such as changing the depth of field or the exposure speed.

According to the image capturing optical lens system of the present disclosure, the image capturing optical lens system of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned image capturing optical lens system and an image sensor is provided, wherein the image sensor is disposed on the image surface of the image capturing optical lens system. Hence, the total track length of the image capturing optical lens system can be reduced efficiently by arranging the surface shape of the object-side surface of the third lens element, and the manufacturing difficulty or flare can be avoided by the arrangement of the surface shape of the fourth lens element. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific embodiments are provided for further explanation.

1ST EMBODIMENT

Figure 2:
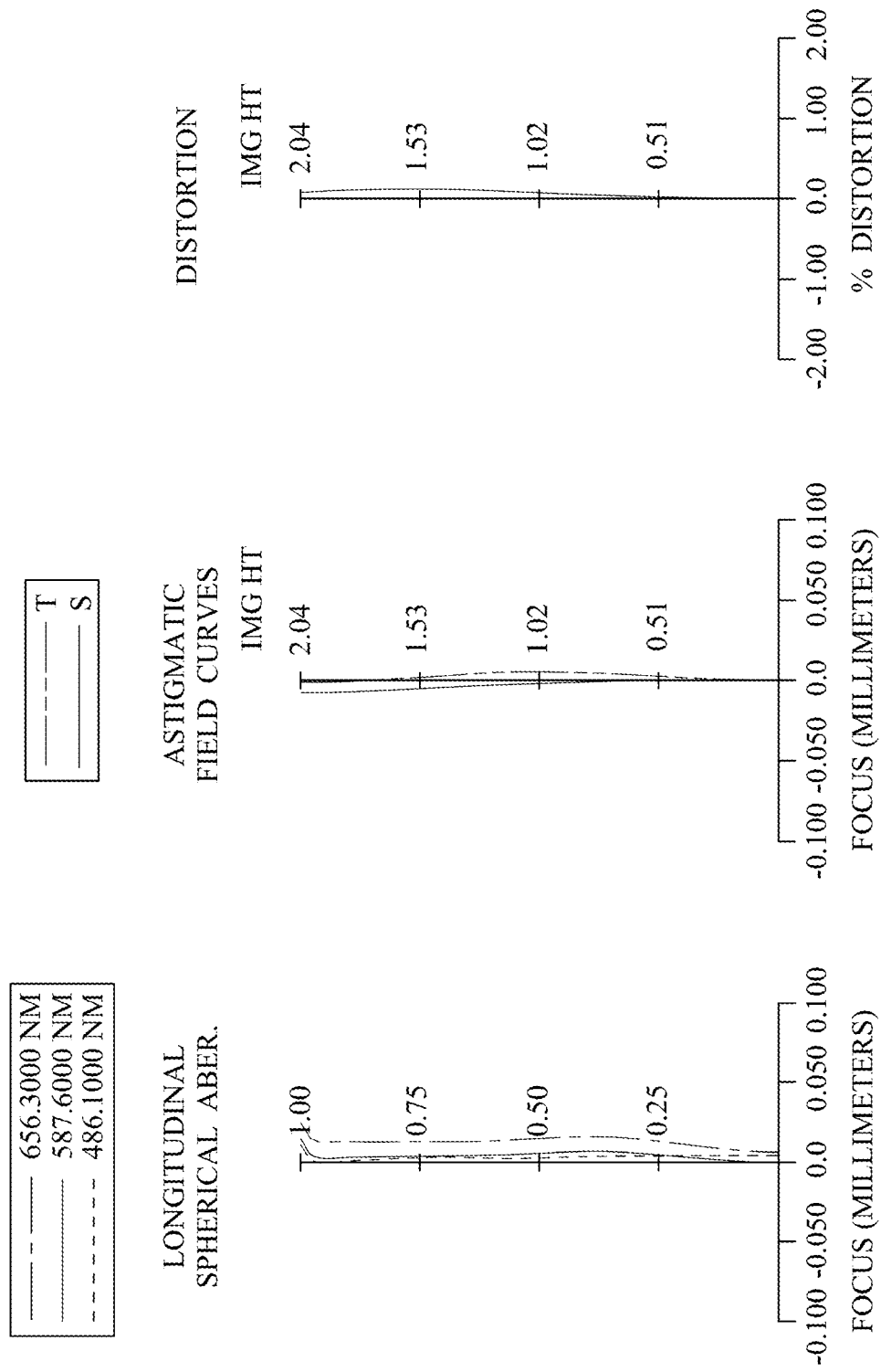
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing optical lens system (its reference numeral is omitted) and an image sensor 170. The image capturing optical lens system includes, in order from an object side to an image side along an optical path, a stop 101, a first lens element 110, a second lens element 120, an aperture stop 100, a third lens element 130, a stop 102, a fourth lens element 140, a IR-cut filter 150 and an image surface 160, wherein the image sensor 170 is disposed on the image surface 160 of the image capturing optical lens system. The image capturing optical lens system includes four lens elements (110, 120, 130, 140) without additional one or more lens elements inserted between the first lens element 110 and the fourth lens element 140.

The first lens element 110 with positive refractive power has an object-side surface 111 being convex in a paraxial region thereof and an image-side surface 112 being convex in a paraxial region thereof. The first lens element 110 is made of plastic material, and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material, and has the object-side surface 131 and the image-side surface 132 being both aspheric.

The fourth lens element 140 with negative refractive power has an object-side surface 141 being planar in a paraxial region thereof and an image-side surface 142 being concave in a paraxial region thereof. The fourth lens element 140 is made of plastic material, and has the object-side surface 141 and the image-side surface 142 being both aspheric. Furthermore, the image-side surface 142 of the fourth lens element 140 includes at least one inflection point and at least one critical point in an off-axis region thereof.

The IR-cut filter 150 is made of glass material, which is located between the fourth lens element 140 and the image surface 160 in order, and will not affect the focal length of the image capturing optical lens system.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,
X is the displacement in parallel with an optical axis from the intersection point of the aspheric surface and the optical axis to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient.

In the image capturing optical lens system according to the 1st embodiment, when a focal length of the image capturing optical lens system is f, an f-number of the image capturing optical lens system is Fno, and half of a maximum field of view of the image capturing optical lens system is HFOV, these parameters have the following values: f=12.02 mm; Fno=3.52; and HFOV=9.6 degrees.

In the image capturing optical lens system according to the 1st embodiment, when half of a maximum field of view of the image capturing optical lens system is HFOV, the following condition is satisfied: tan(2×HFOV)=0.35.

In the image capturing optical lens system according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, a minimum Abbe number of the lens elements of the image capturing optical lens system is V min, a refractive index of the first lens element 110 is N1, a refractive index of the second lens element 120 is N2, a refractive index of the third lens element 130 is N3, and a refractive index of the fourth lens element 140 is N4, the following conditions are satisfied: V2+V3=37.8; V min=14.0; V1/N1=36.48; V2/N2=14.59; V3/N3=8.22; and V4/N4=12.29; wherein, according to the 1st embodiment, V1=56.0, V2=23.8, V3=14.0, V4=20.4, thus, the minimum Abbe number of the lens elements of the image capturing optical lens system V min=V3.

In the image capturing optical lens system according to the 1st embodiment, when a central thickness of the first lens element 110 is CT1, and a central thickness of the second lens element 120 is CT2, the following condition is satisfied: CT1/CT2=2.59.

In the image capturing optical lens system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and a sum of all axial distances between adjacent lens elements of the image capturing optical lens system is ΣAT, the following condition is satisfied: ΣAT/T23=1.15; wherein, according to the 1st embodiment, ΣAT=T12+T23+T34.

In the image capturing optical lens system according to the 1st embodiment, when the focal length of the image capturing optical lens system is f, and an axial distance between the object-side surface 111 of the first lens element 110 and the image surface 160 is TL, the following condition is satisfied: TL/f=0.94.

In the image capturing optical lens system according to the 1st embodiment, when an axial distance between the object-side surface 111 of the first lens element 110 and the image-side surface 142 of the fourth lens element 140 is Td, and an axial distance between the image-side surface 142 of the fourth lens element 140 and the image surface 160 is BL, the following condition is satisfied: Td/BL=1.29.

In the image capturing optical lens system according to the 1st embodiment, when a maximum image height of the image capturing optical lens system is ImgH, and an entrance pupil diameter of the image capturing optical lens system is EPD, the following condition is satisfied: ImgH/EPD=0.60.

In the image capturing optical lens system according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=−0.83.

In the image capturing optical lens system according to the 1st embodiment, when the focal length of the image capturing optical lens system is f, a curvature radius of the object-side surface 111 of the first lens element 110 is R1, and a curvature radius of the image-side surface 122 of the second lens element 120 is R4, the following condition is satisfied: (f/R1)+(f/R4)=7.51.

In the image capturing optical lens system according to the 1st embodiment, when the focal length of the image capturing optical lens system is f, a curvature radius of the object-side surface 141 of the fourth lens element 140 is R7, and a curvature radius of the image-side surface 142 of the fourth lens element 140 is R8, the following condition is satisfied: f/|R7|+f/|R8|=1.53.

In the image capturing optical lens system according to the 1st embodiment, when the focal length of the image capturing optical lens system is f, and the maximum image height of the image capturing optical lens system is ImgH, the following condition is satisfied: f/ImgH=5.89.

In the image capturing optical lens system according to the 1st embodiment, when the focal length of the image capturing optical lens system is f, a focal length of the first lens element 110 is f1, a focal length of the second lens element 120 is f2, a focal length of the third lens element 130 is f3, and a focal length of the fourth lens element 140 is f4, the following conditions are satisfied: (|f/f1|+|f/f2|)/(|f/f3|+|f/f4|)=2.46; and f2/f4=0.41.

In the image capturing optical lens system according to the 1st embodiment, when a maximum distance between an optical effective region of the object-side surface 111 of the first lens element 110 and the optical axis is Y11, and a maximum image height of the image capturing optical lens system is ImgH, the following condition is satisfied: Y11/ImgH=0.84.

The detailed optical data of the 1st embodiment are shown in Table 1 and the aspheric surface data are shown in Table 2 below.

TABLE 1

1st Embodiment
f = 12.02 mm, Fno = 3.52, HFOV = 9.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.485 | | | | |
| 2 | Lens 1 | 3.152 | ASP | 2.237 | Plastic | 1.534 | 56.0 | 4.90 |
| 3 | | −11.608 | ASP | 0.030 | | | | |
| 4 | Lens 2 | −100.000 | ASP | 0.865 | Plastic | 1.634 | 23.8 | −4.95 |
| 5 | | 3.251 | ASP | 0.258 | | | | |
| 6 | Ape. Stop | Plano | | 1.321 | | | | |
| 7 | Lens 3 | 9.412 | ASP | 0.772 | Plastic | 1.704 | 14.0 | 12.26 |
| 8 | | −100.000 | ASP | 0.103 | | | | |
| 9 | Stop | Plano | | 0.099 | | | | |
| 10 | Lens 4 | ∞ | ASP | 0.650 | Plastic | 1.660 | 20.4 | −11.94 |
| 11 | | 7.877 | ASP | 4.000 | | | | |
| 12 | IR-cut filter | Plano | | 0.210 | Glass | 1.517 | 64.2 | — |
| 13 | | Plano | | 0.710 | | | | |
| 14 | Image | Plano | | — | | | | |

Reference wavelength is 587.6 nm (d-line).
Effective radius of Surface 1 (Stop 101) is 1.720 mm.
Effective radius of Surface 9 (Stop 102) is 1.180 mm.

TABLE 2

Aspheric Coefficients

| Surface # | 2 | 3 | 4 | 5 |
|---|---|---|---|---|
| k= | −1.2238E−01 | 0.0000E+00 | 0.0000E+00 | −2.3544E+00 |
| A4= | −3.7358E−04 | 3.0556E−02 | 1.9018E−02 | −9.2731E−04 |
| A6= | −5.7090E−05 | −5.4082E−02 | −4.5793E−02 | 2.3691E−04 |
| A8= | −9.2300E−05 | 6.3745E−02 | 5.8774E−02 | 9.2831E−03 |
| A10= | 2.1168E−05 | −4.7262E−02 | −4.4384E−02 | −1.0666E−02 |
| A12= | −4.4445E−06 | 2.1955E−02 | 2.1178E−02 | 9.6409E−03 |
| A14= | 2.7818E−08 | −5.8822E−03 | −5.8941E−03 | −5.0747E−03 |
| A16= | | 6.8662E−04 | 7.1966E−04 | 1.1335E−03 |

| Surface # | 7 | 8 | 10 | 11 |
|---|---|---|---|---|
| k= | 0.0000E+00 | 0.0000E+00 | 0.0000E+00 | 0.0000E+00 |
| A4= | 9.5263E−03 | 1.6495E−02 | −4.3399E−02 | −4.8054E−02 |
| A6= | 4.1220E−04 | −2.4221E−02 | −2.0658E−02 | 3.2871E−03 |
| A8= | −6.8598E−03 | 4.5044E−02 | 2.9780E−02 | 1.8298E−03 |
| A10= | 2.0336E−02 | −6.6503E−02 | −3.6447E−02 | −1.1902E−03 |
| A12= | −2.0508E−02 | 7.8895E−02 | 4.0633E−02 | 1.9531E−04 |
| A14= | 1.0941E−02 | −5.0947E−02 | −2.6742E−02 | 2.3916E−06 |
| A16= | −2.3297E−03 | 1.4855E−02 | 8.4750E−03 | 1.1705E−05 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2ND EMBODIMENT

Figure 3:
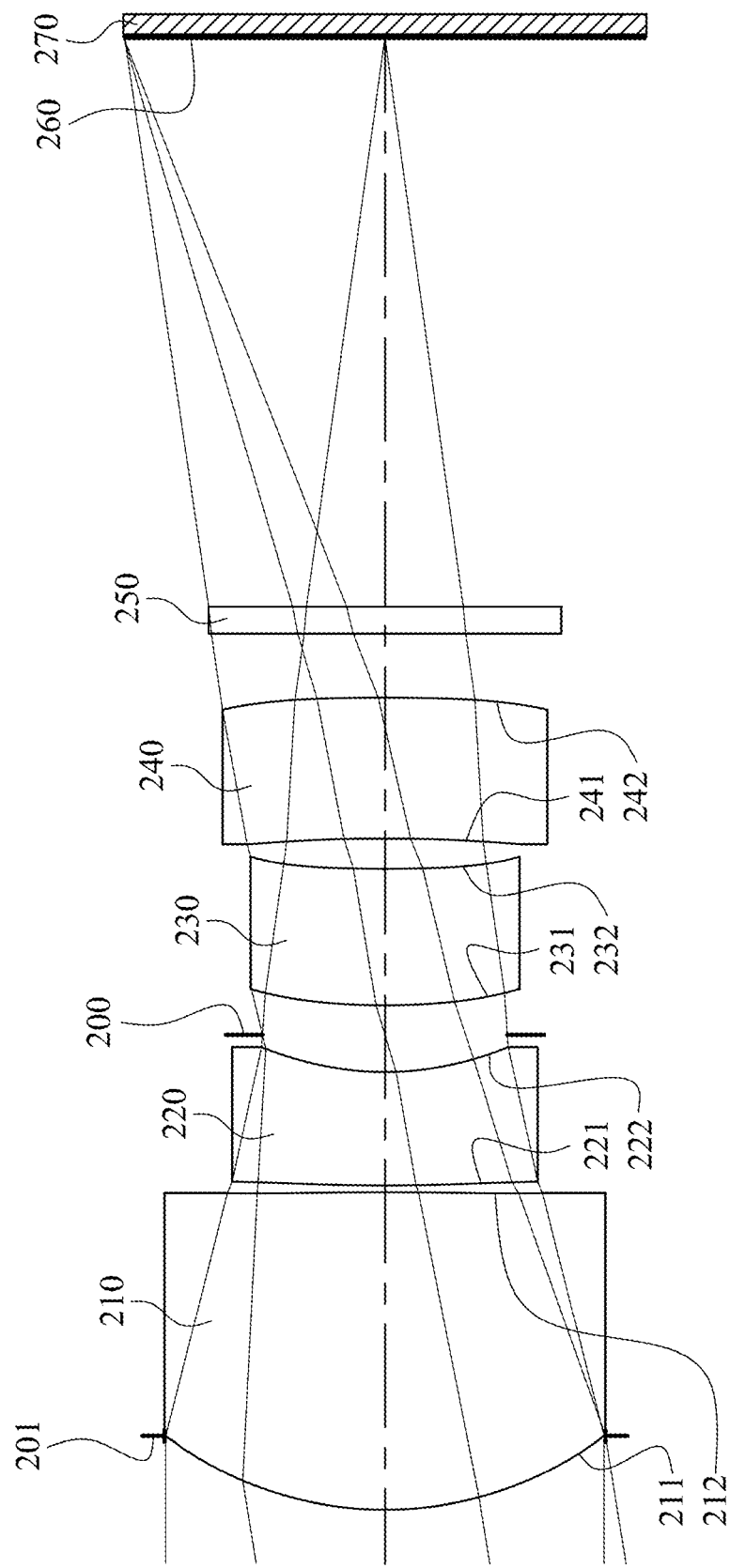
FIG. 3 is a schematic view of an imaging apparatus according to the 2nd embodiment of the present disclosure.
Figure 4:
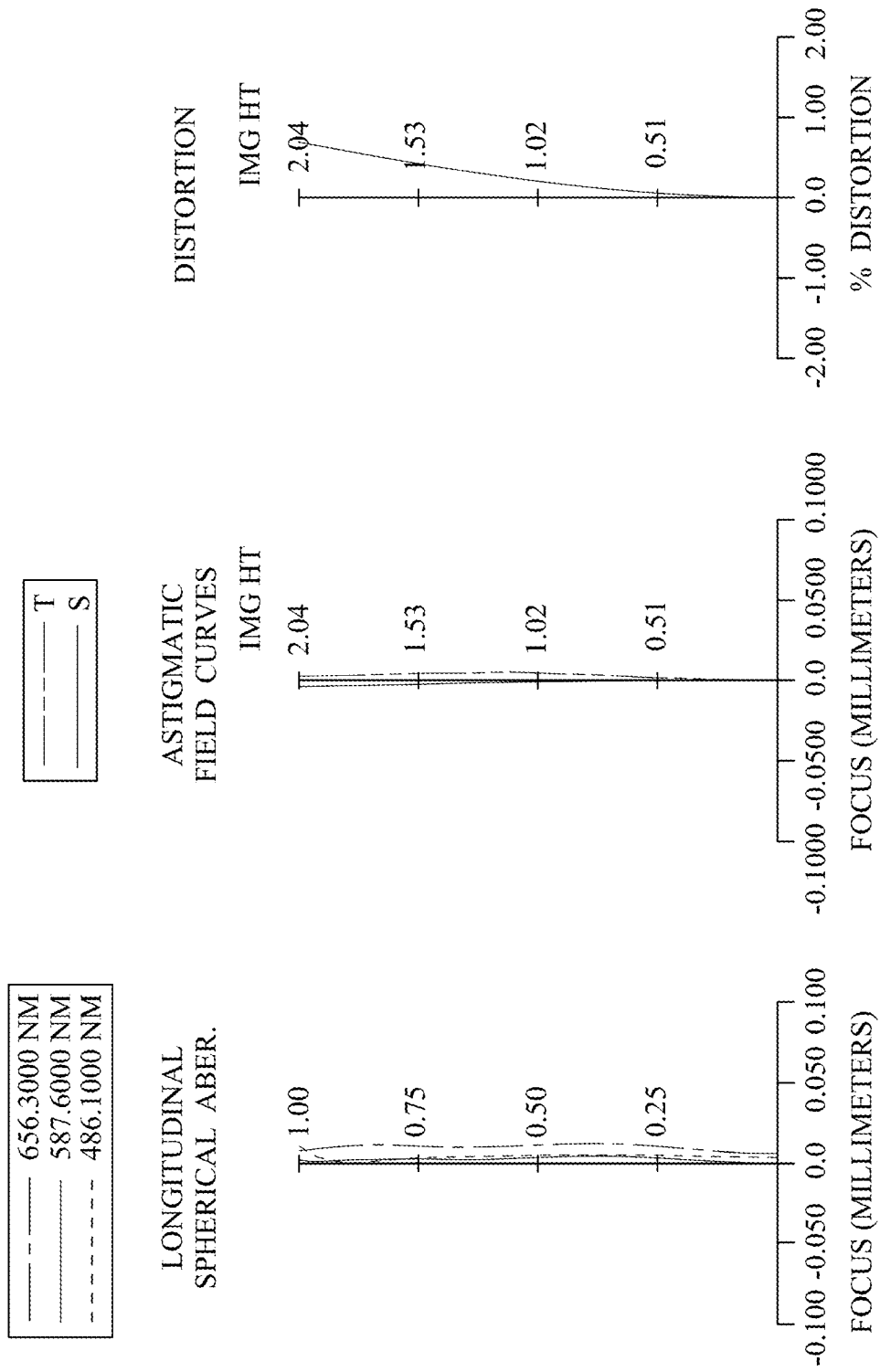
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an image capturing optical lens system (its reference numeral is omitted) and an image sensor 270. The image capturing optical lens system includes, in order from an object side to an image side along an optical path, a stop 201, a first lens element 210, a second lens element 220, an aperture stop 200, a third lens element 230, a fourth lens element 240, a IR-cut filter 250 and an image surface 260, wherein the image sensor 270 is disposed on the image surface 260 of the image capturing optical lens system. The image capturing optical lens system includes four lens elements (210, 220, 230, 240) without additional one or more lens elements inserted between the first lens element 210 and the fourth lens element 240.

The first lens element 210 with positive refractive power has an object-side surface 211 being convex in a paraxial region thereof and an image-side surface 212 being convex in a paraxial region thereof. The first lens element 210 is made of glass material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of glass material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material, and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material, and has the object-side surface 241 and the image-side surface 242 being both aspheric.

The IR-cut filter 250 is made of glass material, which is located between the fourth lens element 240 and the image surface 260 in order, and will not affect the focal length of the image capturing optical lens system.

The detailed optical data of the 2nd embodiment are shown in Table 3 and the aspheric surface data are shown in Table 4 below.

TABLE 3

2nd Embodiment
f = 12.56 mm, Fno = 3.67, HFOV = 9.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.575 | | | | |
| 2 | Lens 1 | 2.832 | ASP | 2.483 | Glass | 1.543 | 62.9 | 4.85 |
| 3 | | −25.655 | ASP | 0.053 | | | | |
| 4 | Lens 2 | 14.023 | ASP | 0.887 | Glass | 1.839 | 23.9 | −3.39 |
| 5 | | 2.295 | ASP | 0.289 | | | | |
| 6 | Ape. Stop | Plano | | 0.230 | | | | |
| 7 | Lens 3 | 5.314 | ASP | 1.067 | Plastic | 1.704 | 14.0 | 13.73 |
| 8 | | 10.822 | ASP | 0.239 | | | | |
| 9 | Lens 4 | −17.195 | ASP | 1.100 | Plastic | 1.634 | 23.8 | −421.31 |
| 10 | | −18.835 | ASP | 0.500 | | | | |
| 11 | IR-cut filter | Plano | | 0.210 | Glass | 1.517 | 64.2 | — |
| 12 | | Plano | | 4.459 | | | | |
| 13 | Image | Plano | | — | | | | |

Reference wavelength is 587.6 nm (d-line).
Effective radius of Surface 1 (Stop 201) is 1.720 mm.

TABLE 4

Aspheric Coefficients

| Surface # | 2 | 3 | 4 | 5 |
|---|---|---|---|---|
| k= | 1.9735E−02 | 0.0000E+00 | 0.0000E+00 | −2.6153E+00 |
| A4= | 4.8240E−05 | 2.2265E−02 | −6.2159E−03 | −1.6485E−03 |
| A6= | 8.7141E−05 | −3.0820E−02 | −1.8168E−02 | 4.5682E−03 |
| A8= | −6.5387E−05 | 3.1698E−02 | 1.9755E−02 | −6.7564E−03 |
| A10= | 2.4119E−05 | −1.5010E−02 | −2.8225E−03 | 4.1350E−02 |
| A12= | −2.9079E−06 | 3.6399E−03 | −4.8065E−03 | −4.7894E−02 |
| A14= | 1.3890E−08 | −1.0996E−03 | 1.9661E−03 | 2.0056E−02 |
| A16= | | 2.6999E−04 | −1.6419E−04 | −2.6443E−03 |

| Surface# | 7 | 8 | 9 | 10 |
|---|---|---|---|---|
| k= | 0.0000E+00 | 0.0000E+00 | 0.0000E+00 | 0.0000E+00 |
| A4= | 1.3535E−02 | 1.9683E−02 | −2.2471E−02 | −1.9684E−02 |
| A6= | 3.8687E−03 | 5.6418E−03 | 6.4581E−03 | 5.0626E−04 |
| A8= | −4.6318E−03 | 1.3306E−02 | −7.0628E−03 | −1.4144E−03 |
| A10= | 1.9445E−02 | −5.4764E−03 | 3.0400E−02 | 2.3628E−03 |
| A12= | −1.1619E−02 | 2.5689E−02 | −2.3075E−02 | −1.9859E−03 |
| A14= | −5.2645E−03 | −3.1855E−02 | 5.5594E−03 | 6.9409E−04 |
| A16= | 4.1752E−03 | 1.0095E−02 | −6.1269E−04 | −9.3026E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 12.56 | ΣAT/T23 | 1.56 |
| Fno | 3.67 | TL/f | 0.92 |
| HFOV [degrees] | 9.2 | Td/BL | 1.23 |
| tan(2 × HFOV) | 0.33 | ImgH/EPD | 0.60 |
| V2 + V3 | 37.9 | (R5 + R6)/(R5 − R6) | −2.93 |
| Vmin | 14.0 | (f/R1) + (f/R4) | 9.91 |
| V1/N1 | 40.78 | f/|R7| + f/|R8| | 1.40 |
| V2/N2 | 12.97 | f/ImgH | 6.16 |
| V3/N3 | 8.22 | (|f/f1| + |f/f2|)/(|f/f3| + |f/f4|) | 6.67 |
| V4/N4 | 14.59 | f2/f4 | 0.01 |
| CT1/CT2 | 2.80 | Y11/ImgH | 0.84 |

3RD EMBODIMENT

Figure 5:
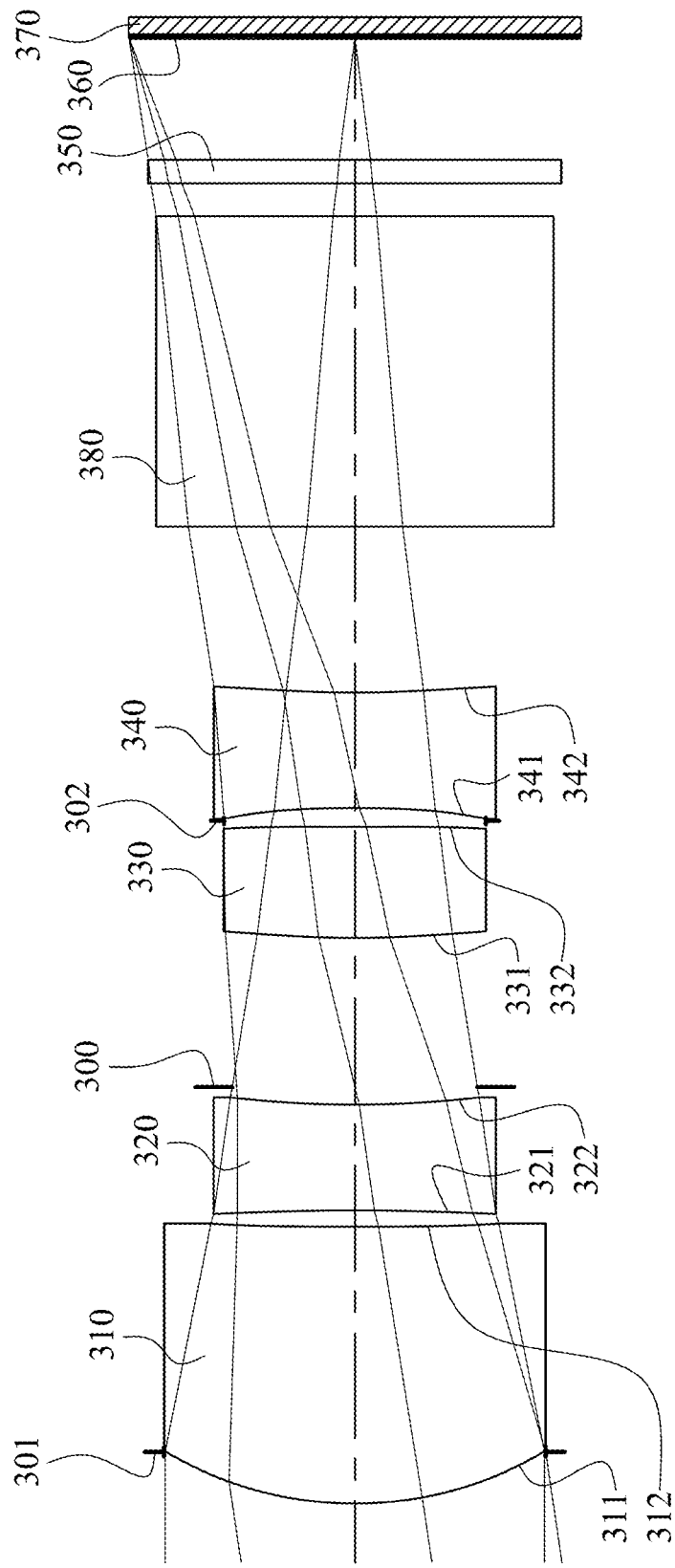
FIG. 5 is a schematic view of an imaging apparatus according to the 3rd embodiment of the present disclosure.
Figure 6:
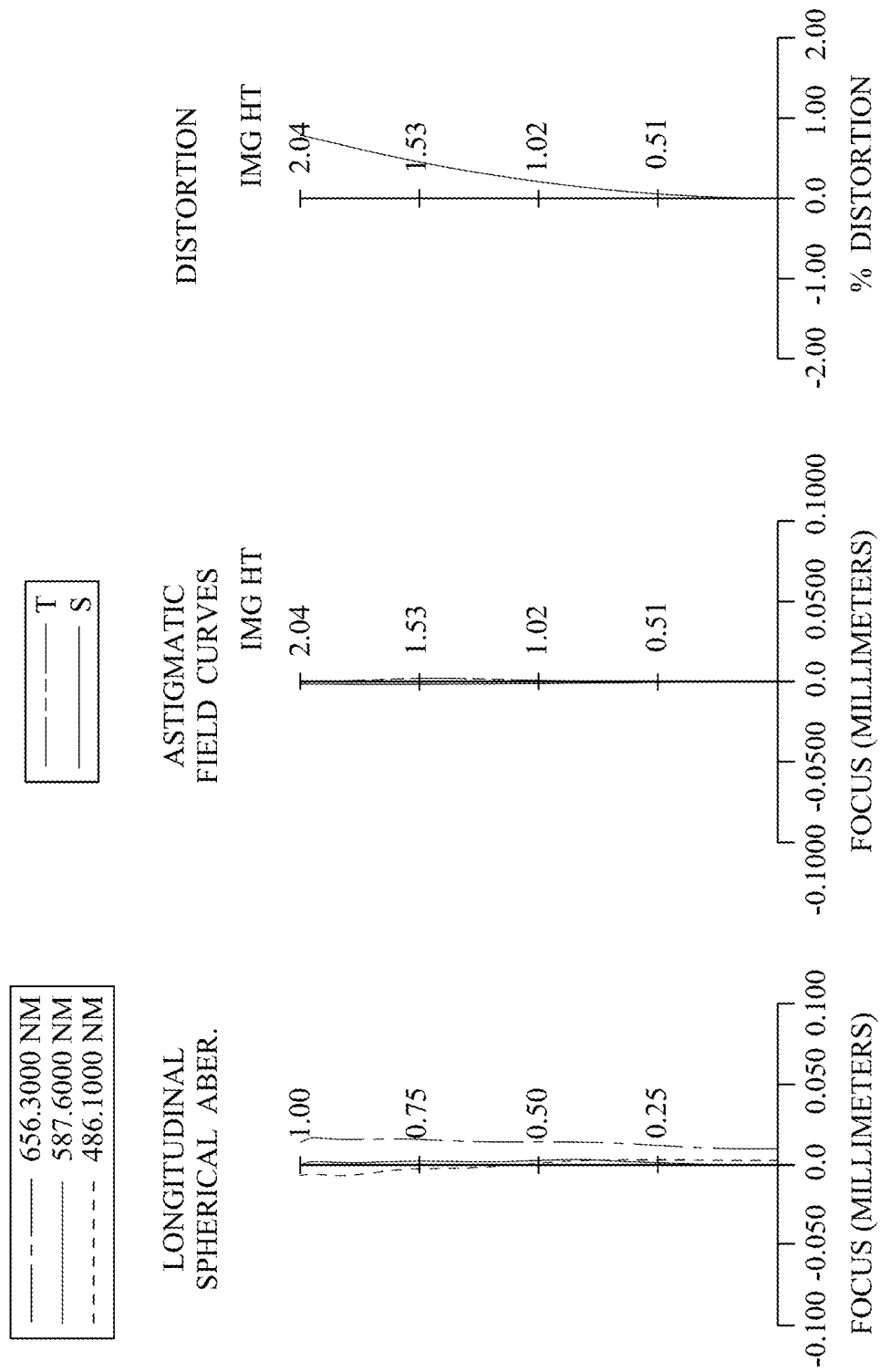
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an image capturing optical lens system (its reference numeral is omitted) and an image sensor 370. The image capturing optical lens system includes, in order from an object side to an image side along an optical path, a stop 301, a first lens element 310, a second lens element 320, an aperture stop 300, a third lens element 330, a stop 302, a fourth lens element 340, a reflective element 380, a IR-cut filter 350 and an image surface 360, wherein the image sensor 370 is disposed on the image surface 360 of the image capturing optical lens system. The image capturing optical lens system includes four lens elements (310, 320, 330, 340) without additional one or more lens elements inserted between the first lens element 310 and the fourth lens element 340.

The first lens element 310 with positive refractive power has an object-side surface 311 being convex in a paraxial region thereof and an image-side surface 312 being concave in a paraxial region thereof. The first lens element 310 is made of plastic material, and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material, and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material, and has the object-side surface 341 and the image-side surface 342 being both aspheric. Furthermore, the image-side surface 342 of the fourth lens element 340 includes at least one inflection point in an off-axis region thereof.

The reflective element 380 and the IR-cut filter 350 are made of glass material, which are located between the fourth lens element 340 and the image surface 360 in order, and will not affect the focal length of the image capturing optical lens system.

The detailed optical data of the 3rd embodiment are shown in Table 5 and the aspheric surface data are shown in Table 6 below.

TABLE 5

3rd Embodiment
f = 13.54 mm, Fno = 3.96, HFOV = 8.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.466 | | | | |
| 2 | Lens 1 | 3.352 | ASP | 2.500 | Plastic | 1.534 | 56.0 | 6.43 |
| 3 | | 100.000 | ASP | 0.150 | | | | |
| 4 | Lens 2 | −19.324 | ASP | 0.952 | Plastic | 1.669 | 19.5 | −9.15 |
| 5 | | 9.135 | ASP | 0.162 | | | | |
| 6 | Ape. Stop | Plano | | 1.348 | | | | |
| 7 | Lens 3 | 9.172 | ASP | 1.000 | Plastic | 1.704 | 14.0 | 14.28 |
| 8 | | 100.000 | ASP | 0.054 | | | | |
| 9 | Stop | Plano | | 0.119 | | | | |
| 10 | Lens 4 | −11.885 | ASP | 1.043 | Plastic | 1.639 | 23.3 | −8.27 |
| 11 | | 9.842 | ASP | 1.500 | | | | |
| 12 | Prism | Plano | | 2.800 | Glass | 1.517 | 64.2 | — |
| 13 | | Plano | | 0.300 | | | | |
| 14 | IR-cut filter | Plano | | 0.210 | Glass | 1.517 | 64.2 | — |
| 15 | | Plano | | 1.113 | | | | |
| 16 | Image | Plano | | — | | | | |

Reference wavelength is 587.6 nm (d-line).
Effective radius of Surface 1 (Stop 301) is 1.720 mm.
Effective radius of Surface 9 (Stop 302) is 1.180 mm.

TABLE 6

Aspheric Coefficients

| Surface # | 2 | 3 | 4 | 5 |
|---|---|---|---|---|
| k= | 7.4671E−02 | 0.0000E+00 | 0.0000E+00 | −3.2150E+00 |
| A4= | −2.1079E−04 | 9.2412E−03 | 7.0080E−03 | −6.7604E−04 |
| A6= | 3.2173E−06 | −3.4865E−03 | −5.8614E−03 | −3.0851E−03 |
| A8= | 2.8121E−06 | 1.3122E−03 | 5.9631E−03 | 5.8295E−03 |
| A10= | −6.8590E−06 | 9.4108E−04 | −4.2249E−03 | −5.4802E−03 |
| A12= | 2.6795E−06 | −1.5055E−03 | 1.9194E−03 | 2.9898E−03 |
| A14= | −3.4309E−07 | 8.3135E−04 | −3.8499E−04 | −6.8007E−04 |
| A16= |  | −1.7677E−04 | −2.9186E−06 | −6.5703E−06 |

| Surface # | 7 | 8 | 10 | 11 |
|---|---|---|---|---|
| k= | 0.0000E+00 | 0.0000E+00 | 0.0000E+00 | 0.0000E+00 |
| A4= | −8.0245E−03 | −5.4629E−03 | −1.5498E−02 | −1.2332E−02 |
| A6= | −3.5856E−03 | −3.0597E−02 | −3.1572E−02 | −6.8675E−04 |
| A8= | 5.0568E−03 | 6.2123E−02 | 6.5914E−02 | 2.8672E−03 |
| A10= | −7.9177E−03 | −9.2284E−02 | −9.5345E−02 | −2.1179E−03 |
| A12= | 9.9165E−03 | 9.2755E−02 | 9.3974E−02 | 1.0625E−03 |
| A14= | −6.4463E−03 | −5.0830E−02 | −5.1043E−02 | −4.0833E−04 |
| A16= | 1.5965E−03 | 1.1227E−02 | 1.1235E−02 | 7.9216E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 13.54 | ΣAT/T23 | 1.21 |
| Fno | 3.96 | TL/f | 0.98 |
| HFOV [degrees] | 8.5 | Td/BL | 1.24 |
| tan(2 × HFOV) | 0.31 | ImgH/EPD | 0.60 |
| V2 + V3 | 33.5 | (R5 + R6)/(R5 − R6) | −1.20 |
| Vmin | 14.0 | (f/R1) + (f/R4) | 5.52 |
| V1/N1 | 36.48 | f/|R7| + f/|R8| | 2.52 |
| V2/N2 | 11.65 | f/ImgH | 6.64 |
| V3/N3 | 8.22 | (|f/f1| + |f/f2|)/(|f/f3| + |f/f4|) | 1.39 |
| V4/N4 | 14.21 | f2/f4 | 1.11 |
| CT1/CT2 | 2.63 | Y11/ImgH | 0.84 |
| Tgp | 556.00 | Tgp/Np | 366.56 |

Specifically, in the foregoing table, a glass transition temperature of a material of the reflective element 380 is Tgp, and a refractive index of the reflective element 380 is Np.

Figure 17:
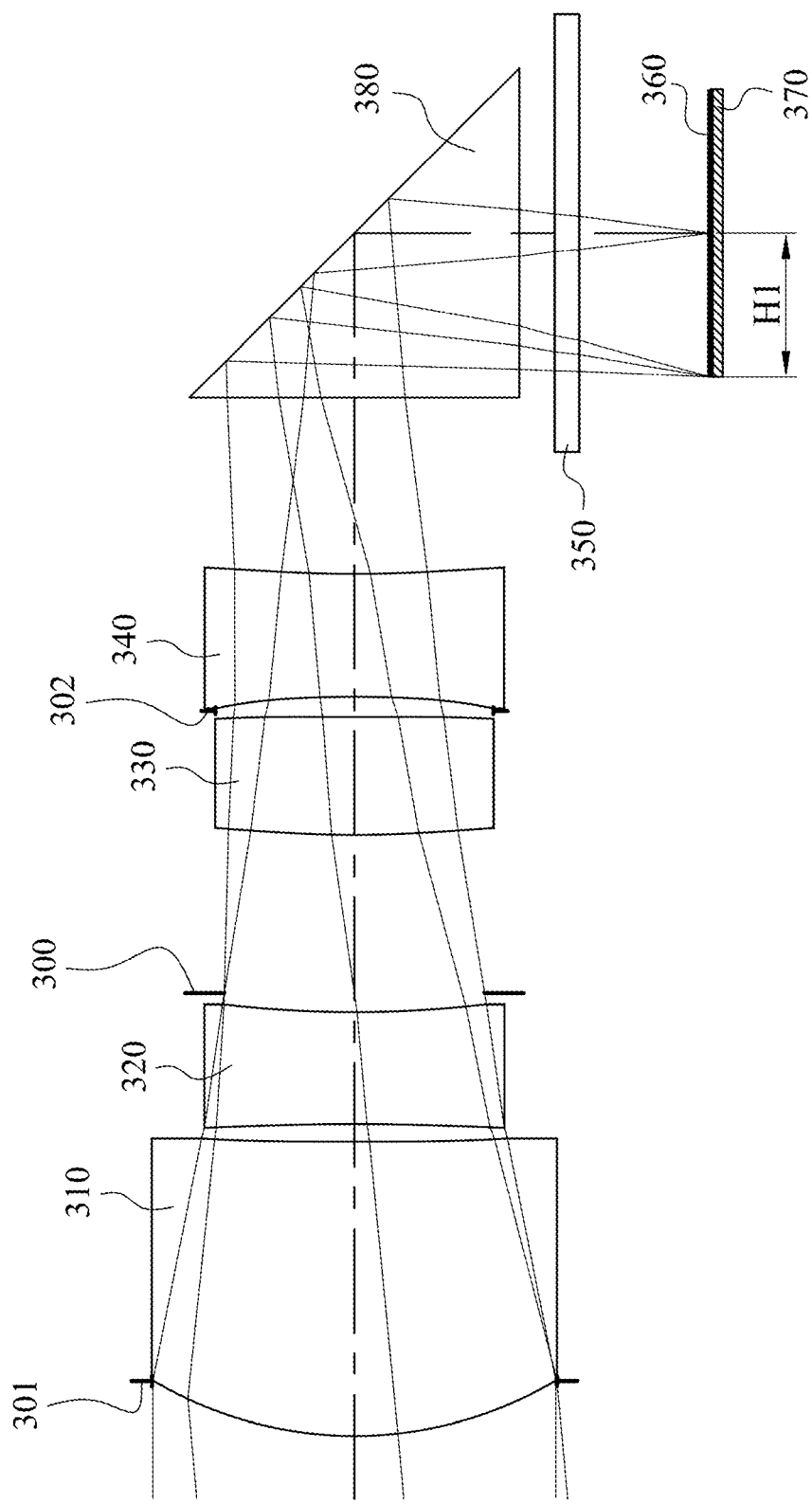
FIG. 17 is a schematic view of the imaging apparatus with another reflective element according to the 3rd embodiment of the present disclosure.

Furthermore, FIG. 17 is a schematic view of the imaging apparatus with another reflective element 380 according to the 3rd embodiment of the present disclosure. In FIG. 17, the reflective element 380 is disposed between the fourth lens element 340 and the IR-cut filter 350, and is a prism for folding the incident light. It should be mentioned, that a maximum image height H1 of the incident light folded by the reflective element 380 is 0.6 times of a maximum image height without the reflective element 380, but the present disclosure is not limited thereto.

4TH EMBODIMENT

Figure 7:
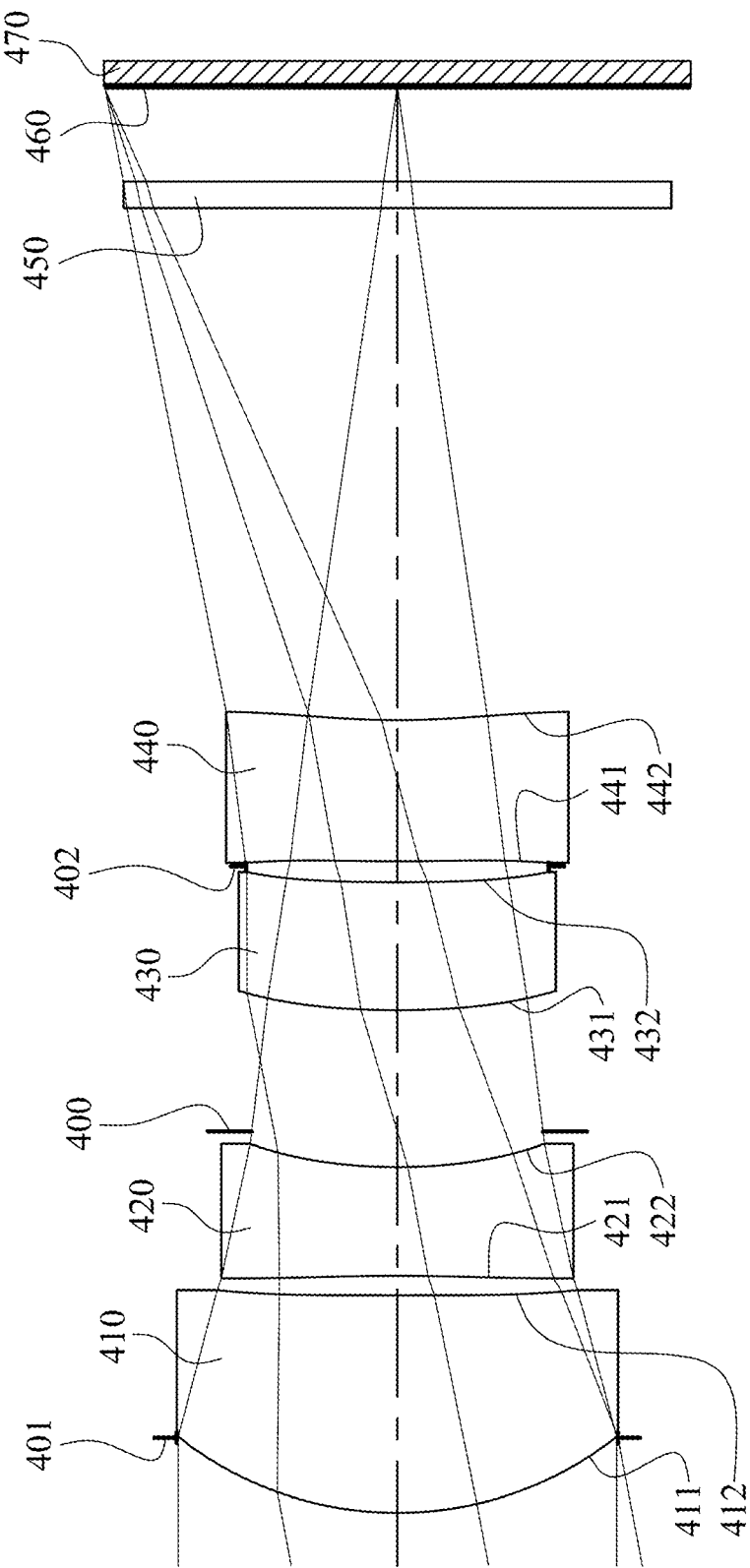
FIG. 7 is a schematic view of an imaging apparatus according to the 4th embodiment of the present disclosure.

FIG. 7 is a schematic view of an imaging apparatus according to the 4th embodiment of the present disclosure.

Figure 8:
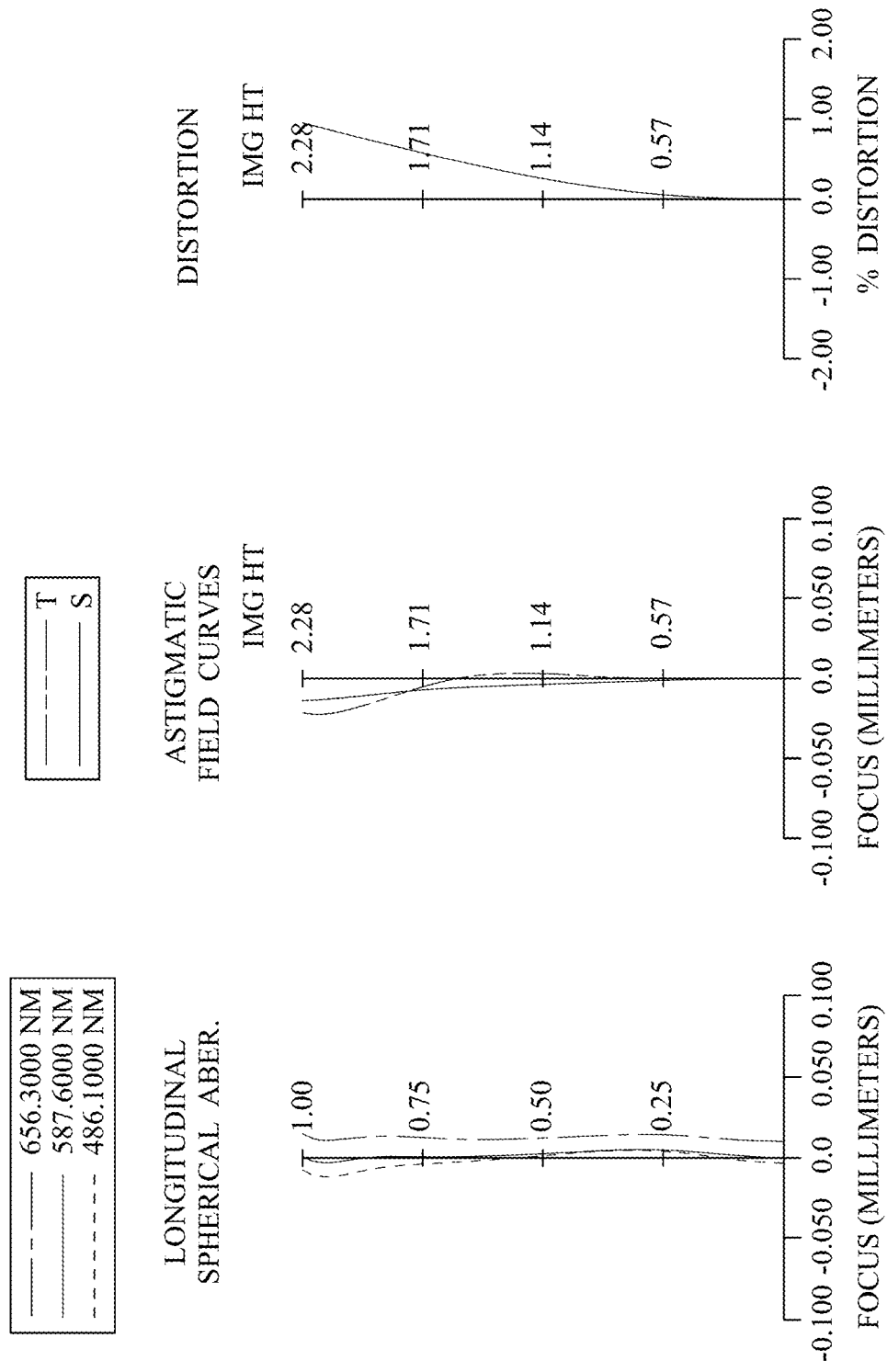
FIG. 8 shows spherical aberration curves, astigmatic field curves and a distortion curve of the imaging apparatus according to the 4th embodiment.

FIG. 8 shows spherical aberration curves, astigmatic field curves and a distortion curve of the imaging apparatus according to the 4th embodiment. In FIG. 7, the imaging apparatus includes an image capturing optical lens system (its reference numeral is omitted) and an image sensor 470. The image capturing optical lens system includes, in order from an object side to an image side along an optical path, a stop 401, a first lens element 410, a second lens element 420, an aperture stop 400, a third lens element 430, a stop 402, a fourth lens element 440, a IR-cut filter 450 and an image surface 460, wherein the image sensor 470 is disposed on the image surface 460 of the image capturing optical lens system. The image capturing optical lens system includes four lens elements (410, 420, 430, 440) without additional one or more lens elements inserted between the first lens element 410 and the fourth lens element 440.

The first lens element 410 with positive refractive power has an object-side surface 411 being convex in a paraxial region thereof and an image-side surface 412 being concave in a paraxial region thereof. The first lens element 410 is made of plastic material, and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material, and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material, and has the object-side surface 441 and the image-side surface 442 being both aspheric. Furthermore, the image-side surface 442 of the fourth lens element 440 includes at least one inflection point in an off-axis region thereof.

The IR-cut filter 450 is made of glass material, which is located between the fourth lens element 440 and the image surface 460 in order, and will not affect the focal length of the image capturing optical lens system.

The detailed optical data of the 4th embodiment are shown in Table 7 and the aspheric surface data are shown in Table 8 below.

TABLE 7

4th Embodiment
f = 11.94 mm, Fno = 3.49, HFOV = 10.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.585 | | | | |
| 2 | Lens 1 | 2.777 | ASP | 1.700 | Plastic | 1.545 | 56.1 | 5.21 |
| 3 | | 100.000 | ASP | 0.152 | | | | |
| 4 | Lens 2 | −20.421 | ASP | 0.850 | Plastic | 1.639 | 23.5 | −5.40 |
| 5 | | 4.212 | ASP | 0.276 | | | | |
| 6 | Ape. Stop | Plano | | 0.950 | | | | |
| 7 | Lens 3 | 6.739 | ASP | 1.000 | Plastic | 1.660 | 20.4 | 15.56 |
| 8 | | 18.450 | ASP | 0.124 | | | | |
| 9 | Stop | Plano | | 0.040 | | | | |
| 10 | Lens 4 | 22.417 | ASP | 1.100 | Plastic | 1.544 | 56.0 | −17.06 |
| 11 | | 6.450 | ASP | 4.000 | | | | |
| 12 | IR-cut filter | Plano | | 0.210 | Glass | 1.517 | 64.2 | — |
| 13 | | Plano | | 0.743 | | | | |
| 14 | Image | Plano | | — | | | | |

Reference wavelength is 587.6 nm (d-line).
Effective radius of Surface 1 (Stop 401) is 1.720 mm.
Effective radius of Surface 9 (Stop 402) is 1.180 mm.

TABLE 8

Aspheric Coefficients

| Surface # | 2 | 3 | 4 | 5 |
|---|---|---|---|---|
| k= | 1.0155E−02 | 0.0000E+00 | 0.0000E+00 | 3.6119E+00 |
| A4= | −4.2149E−04 | −4.3861E−03 | −3.2648E−03 | 3.3447E−03 |
| A6= | 8.2866E−04 | 2.8520E−02 | 3.1388E−02 | 7.2585E−02 |
| A8= | −5.0741E−04 | −3.2182E−02 | −4.1086E−02 | −1.0987E−02 |
| A10= | 2.0773E−04 | 1.9758E−02 | 2.8984E−02 | 4.0046E−03 |
| A12= | −4.0512E−05 | −5.9580E−03 | −1.0796E−02 | 5.0493E−03 |
| A14= | 3.3008E−06 | 6.1526E−04 | 1.8417E−03 | −5.2013E−03 |
| A16= | | 2.8596E−05 | −8.7147E−05 | 1.3824E−03 |

| Surface # | 7 | 8 | 10 | 11 |
|---|---|---|---|---|
| k= | 0.0000E+00 | 0.0000E+00 | 0.0000E+00 | 0.0000E+00 |
| A4= | 1.5841E−02 | 1.4738E−02 | −3.1808E−02 | −3.0431E−02 |
| A6= | 6.4878E−03 | 4.1595E−02 | 5.3300E−02 | 1.6877E−02 |
| A8= | −2.0240E−02 | −1.2282E−01 | −1.5419E−01 | −3.3516E−02 |
| A10= | 2.8532E−02 | 1.8798E−01 | 2.3312E−01 | 4.1720E−02 |
| A12= | −2.1695E−02 | −1.5332E−01 | −1.8840E−01 | −2.8710E−02 |
| A14= | 8.5801E−03 | 6.3946E−02 | 7.7650E−02 | 1.0162E−02 |
| A16= | −1.3952E−03 | −1.0775E−02 | −1.2861E−02 | −1.4456E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 11.94 | ΣAT/T23 | 1.26 |
| Fno | 3.49 | TL/f | 0.93 |
| HFOV [degrees] | 10.7 | Td/BL | 1.25 |
| tan(2 × HFOV) | 0.39 | ImgH/EPD | 0.67 |

-continued

| 4th Embodiment | | | |
|---|---|---|---|
| V2 + V3 | 43.9 | (R5 + R6)/(R5 − R6) | −2.15 |
| Vmin | 20.4 | (f/R1) + (f/R4) | 7.14 |
| V1/N1 | 36.30 | f/|R7| + f/|R8| | 2.38 |
| V2/N2 | 14.34 | f/ImgH | 5.23 |
| V3/N3 | 12.29 | (|f/f1| + |f/f2|)/(|f/f3| + |f/f4|) | 3.07 |
| V4/N4 | 36.26 | f2/f4 | 0.32 |
| CT1/CT2 | 2.00 | Y11/ImgH | 0.75 |

5TH EMBODIMENT

Figure 9:
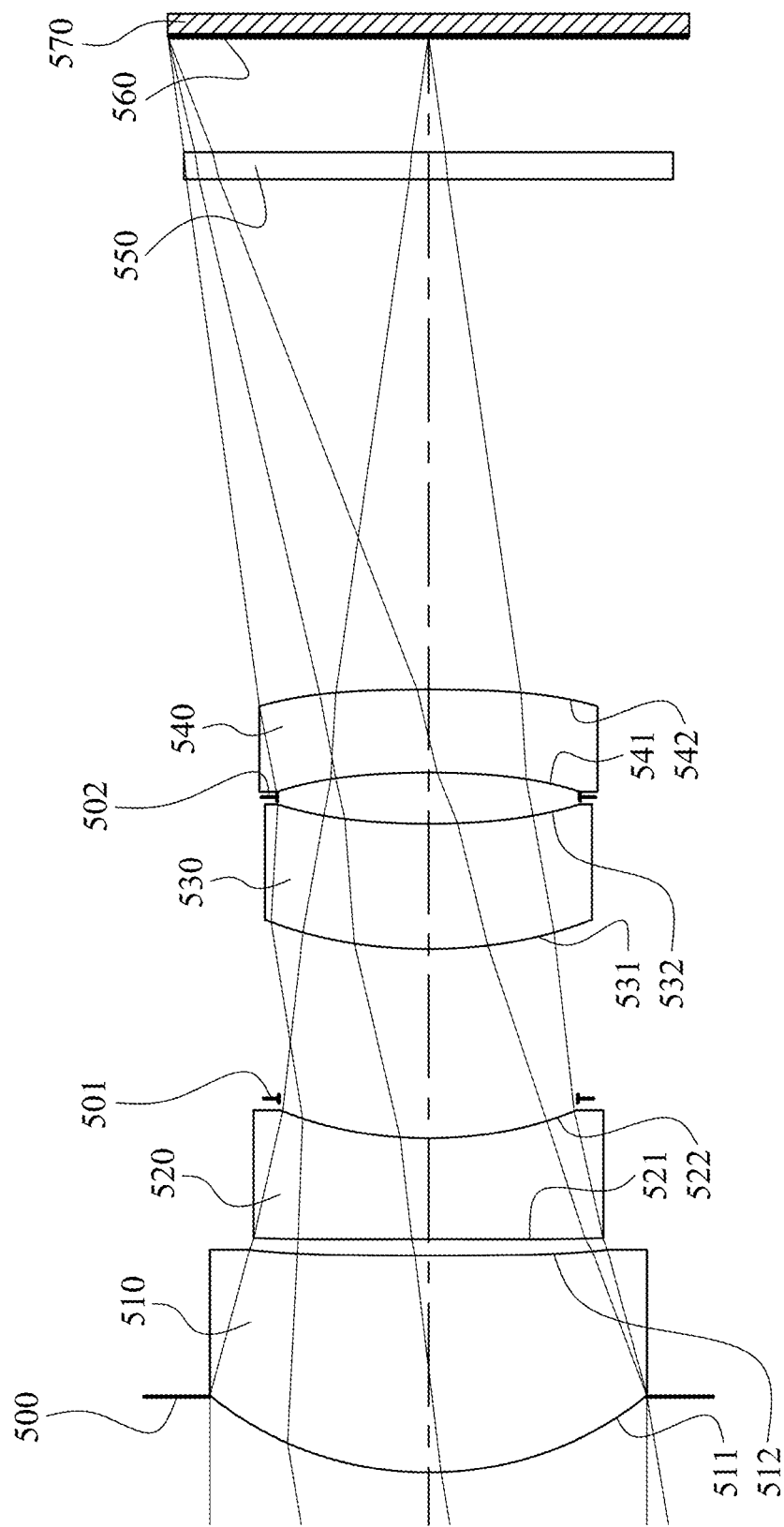
FIG. 9 is a schematic view of an imaging apparatus according to the 5th embodiment of the present disclosure.
Figure 10:
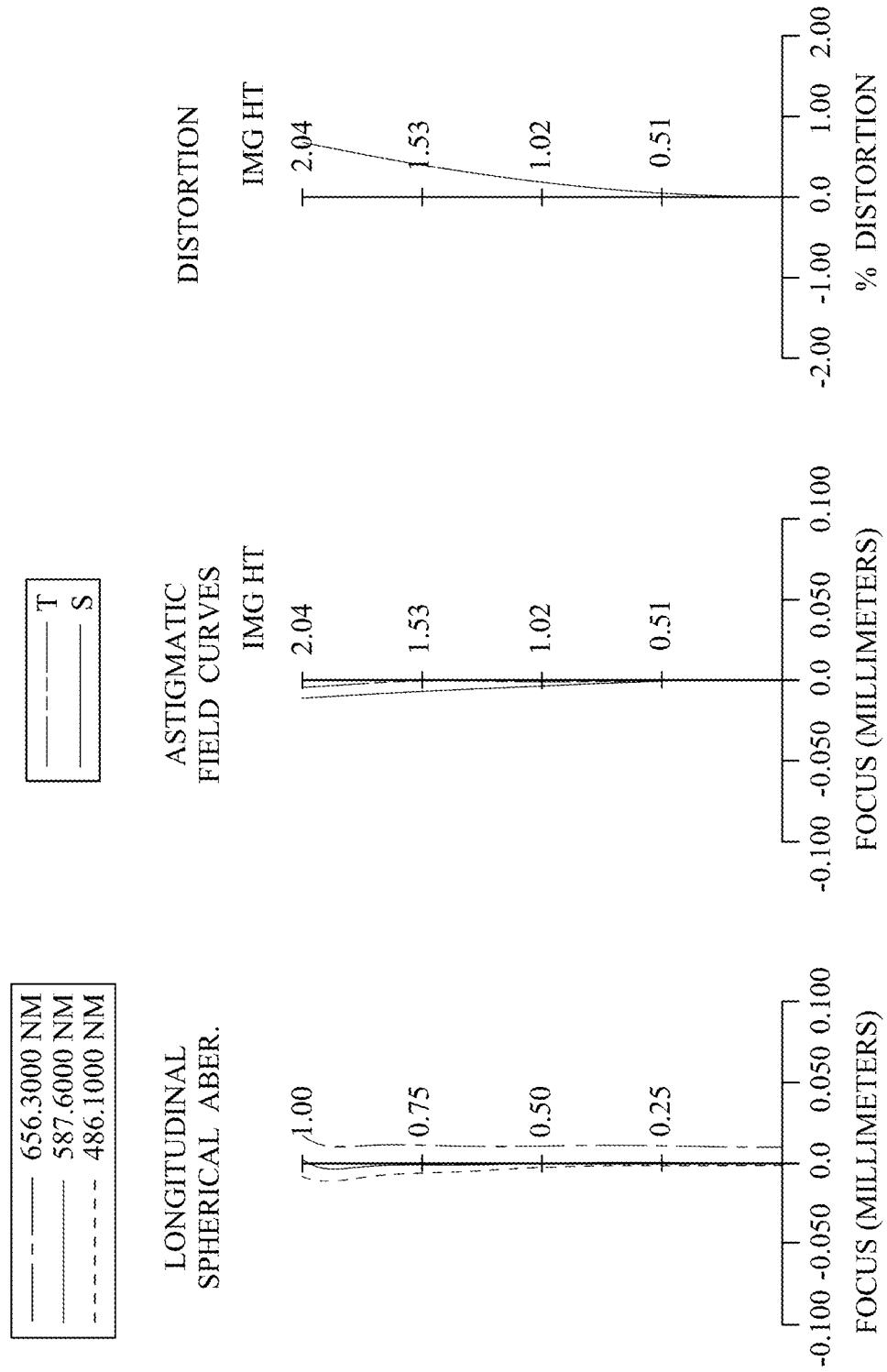
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing optical lens system (its reference numeral is omitted) and an image sensor 570. The image capturing optical lens system includes, in order from an object side to an image side along an optical path, an aperture stop 500, a first lens element 510, a second lens element 520, a stop 501, a third lens element 530, a stop 502, a fourth lens element 540, a IR-cut filter 550 and an image surface 560, wherein the image sensor 570 is disposed on the image surface 560 of the image capturing optical lens system. The image capturing optical lens system includes four lens elements (510, 520, 530, 540) without additional one or more lens elements inserted between the first lens element 510 and the fourth lens element 540.

The first lens element 510 with positive refractive power has an object-side surface 511 being convex in a paraxial region thereof and an image-side surface 512 being concave in a paraxial region thereof. The first lens element 510 is made of plastic material, and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material, and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material, and has the object-side surface 541 and the image-side surface 542 being both aspheric.

The IR-cut filter 550 is made of glass material, which is located between the fourth lens element 540 and the image surface 560 in order, and will not affect the focal length of the image capturing optical lens system.

The detailed optical data of the 5th embodiment are shown in Table 9 and the aspheric surface data are shown in Table 10 below.

TABLE 9

5th Embodiment
f= 12.10 mm, Fno = 3.54, HFOV = 9.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.593 | | | | |
| 2 | Lens 1 | 2.756 | ASP | 1.700 | Plastic | 1.545 | 56.1 | 5.17 |
| 3 | | 100.000 | ASP | 0.129 | | | | |
| 4 | Lens 2 | −100.000 | ASP | 0.790 | Plastic | 1.639 | 23.5 | −5.02 |
| 5 | | 3.322 | ASP | 0.310 | | | | |
| 6 | Stop | Plano | | 1.172 | | | | |
| 7 | Lens 3 | 4.034 | ASP | 0.981 | Plastic | 1.660 | 20.4 | 15.54 |
| 8 | | 6.007 | ASP | 0.210 | | | | |
| 9 | Stop | Plano | | 0.194 | | | | |
| 10 | Lens 4 | −6.573 | ASP | 0.649 | Plastic | 1.544 | 56.0 | −26.02 |
| 11 | | −12.697 | ASP | 4.000 | | | | |
| 12 | IR-cut filter | Plano | | 0.210 | Glass | 1.517 | 64.2 | — |
| 13 | | Plano | | 0.909 | | | | |
| 14 | Image | Plano | | — | | | | |

Reference wavelength is 587.6 nm (d-line).
Effective radius of Surface 6 (Stop 501) is 1.170 mm.
Effective radius of Surface 9 (Stop 502) is 1.185 mm.

TABLE 10

Aspheric Coefficients

| Surface # | 2 | 3 | 4 | 5 |
|---|---|---|---|---|
| k= | 1.5689E−01 | 0.0000E+00 | 0.0000E+00 | 1.8156E+00 |
| A4= | −6.8150E−04 | 1.0706E−02 | 8.3545E−03 | 2.5211E−04 |
| A6= | −1.4168E−04 | −9.5208E−03 | −1.1302E−02 | −3.7217E−03 |
| A8= | 9.6980E−05 | 1.5128E−02 | 1.8527E−02 | 6.6058E−03 |
| A10= | −2.5282E−05 | −1.1799E−02 | −1.5847E−02 | −5.9111E−03 |
| A12= | 2.9856E−06 | 5.1041E−03 | 7.4184E−03 | 1.9231E−03 |
| A14= | 3.6815E−07 | −1.1607E−03 | −1.8165E−03 | 2.1159E−04 |
| A16= | | 1.1188E−04 | 1.8447E−04 | −1.7870E−04 |

TABLE 10-continued

Aspheric Coefficients

| Surface # | 7 | 8 | 10 | 11 |
|---|---|---|---|---|
| k= | 0.0000E+00 | 0.0000E+00 | 0.0000E+00 | 0.0000E+00 |
| A4= | 8.3513E−03 | 1.5231E−02 | −2.1471E−02 | −1.9936E−02 |
| A6= | −3.6837E−04 | 1.6132E−03 | 2.0843E−03 | 1.0817E−03 |
| A8= | 2.2584E−03 | 1.0388E−03 | −7.8798E−03 | −2.2250E−03 |
| A10= | −3.0237E−03 | 5.5471E−03 | 2.2036E−02 | 3.4829E−03 |
| A12= | 1.8103E−03 | −1.1114E−02 | −2.7074E−02 | −3.3634E−03 |
| A14= | −5.7741E−04 | 6.9069E−03 | 1.4306E−02 | 1.4594E−03 |
| A16= | 8.1690E−05 | −1.4873E−03 | −2.8310E−03 | −2.3515E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 12.10 | ΣAT/T23 | 1.36 |
| Fno | 3.54 | TL/f | 0.93 |
| HFOV [degrees] | 9.5 | Td/BL | 1.20 |
| tan(2 × HFOV) | 0.34 | ImgH/EPD | 0.60 |
| V2 + V3 | 43.9 | (R5 + R6)/(R5 − R6) | −5.09 |
| Vmin | 20.4 | (f/R1) + (f/R4) | 8.03 |
| V1/N1 | 36.30 | f/|R7| + f/|R8| | 2.79 |
| V2/N2 | 14.34 | f/ImgH | 5.93 |
| V3/N3 | 12.29 | (|f/f1| + |f/f2|)/(|f/f3| + |f/f4|) | 3.82 |
| V4/N4 | 36.26 | f2/f4 | 0.19 |
| CT1/CT2 | 2.15 | Y11/ImgH | 0.84 |

6TH EMBODIMENT

Figure 11:
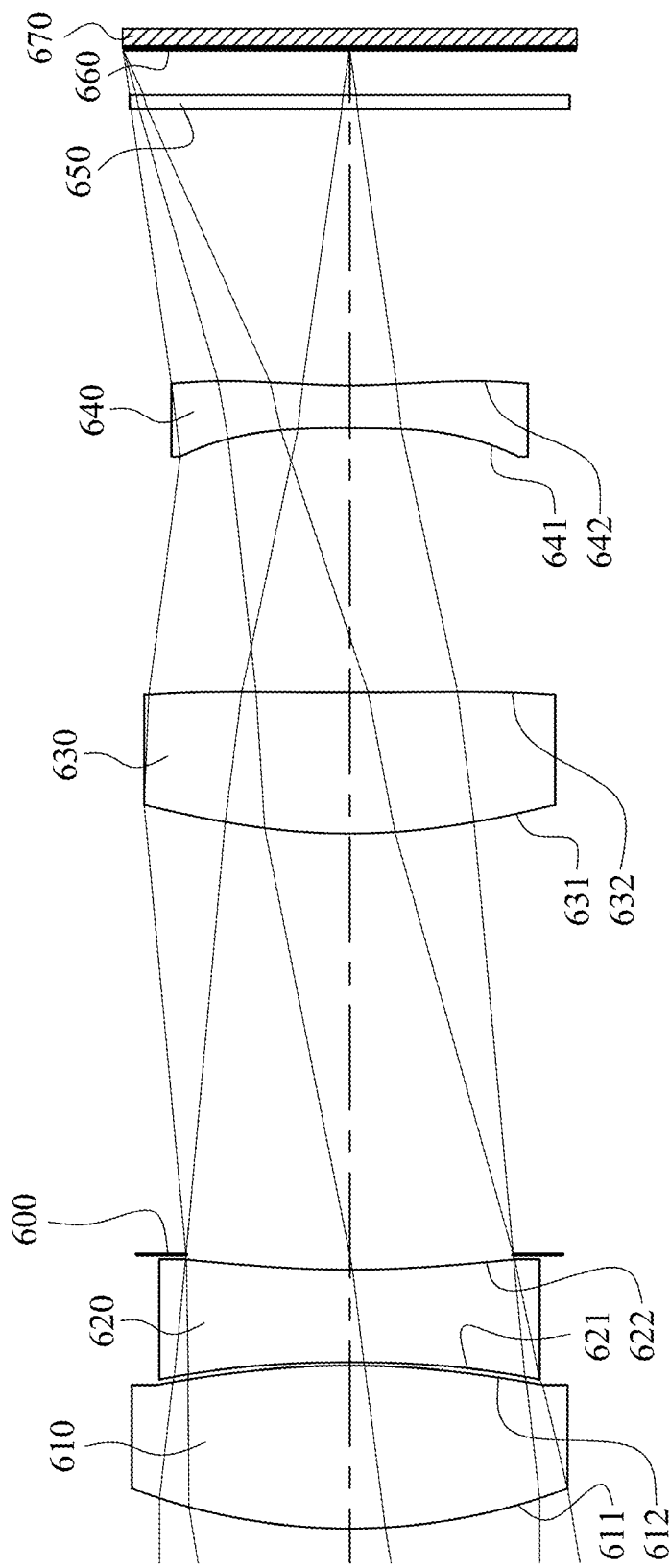
FIG. 11 is a schematic view of an imaging apparatus according to the 6th embodiment of the present disclosure.
Figure 12:
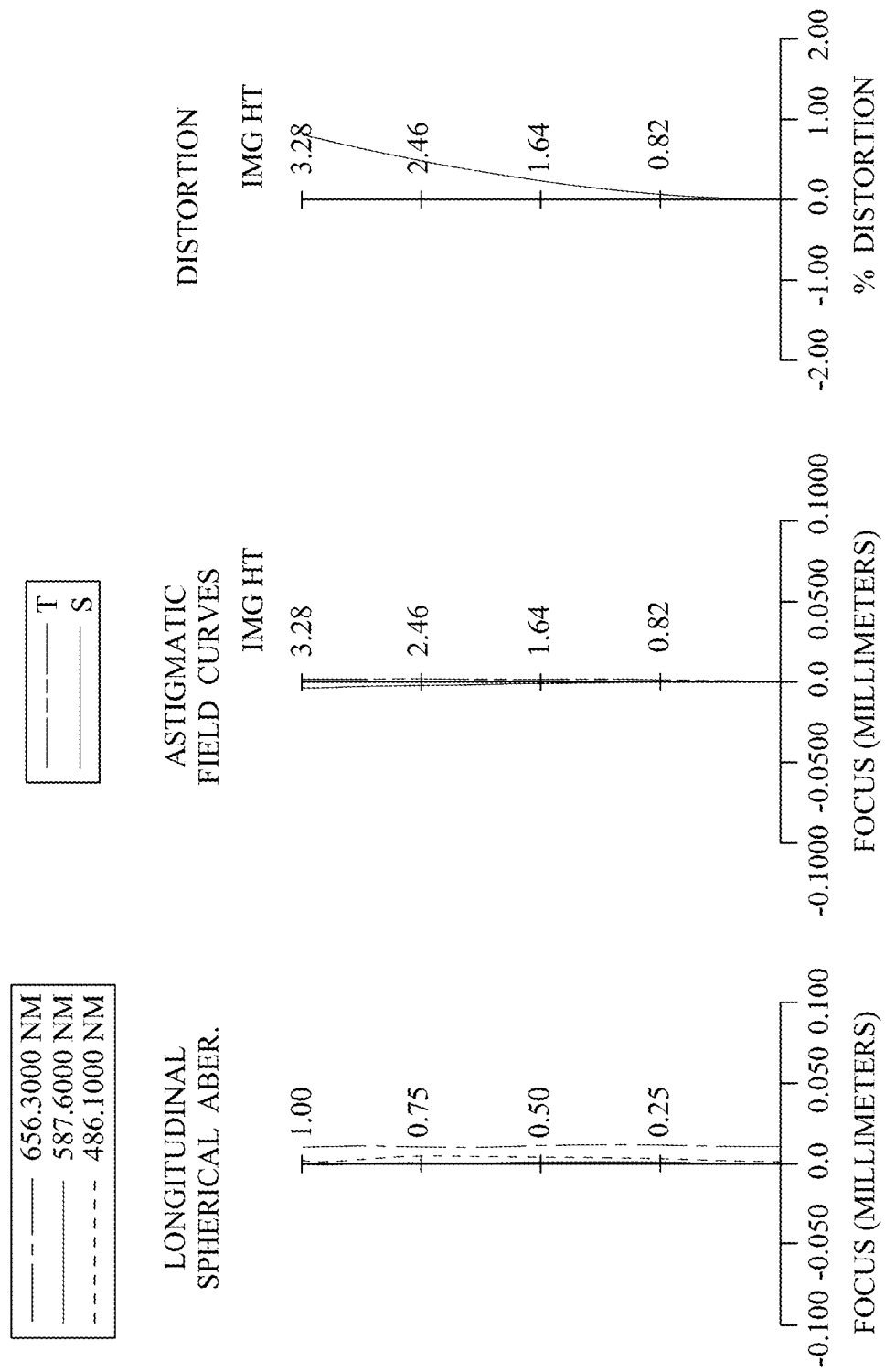
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing optical lens system (its reference numeral is omitted) and an image sensor 670. The image capturing optical lens system includes, in order from an object side to an image side along an optical path, a first lens element 610, a second lens element 620, an aperture stop 600, a third lens element 630, a fourth lens element 640, a IR-cut filter 650 and an image surface 660, wherein the image sensor 670 is disposed on the image surface 660 of the image capturing optical lens system. The image capturing optical lens system includes four lens elements (610, 620, 630, 640) without additional one or more lens elements inserted between the first lens element 610 and the fourth lens element 640.

The first lens element 610 with positive refractive power has an object-side surface 611 being convex in a paraxial region thereof and an image-side surface 612 being convex in a paraxial region thereof. The first lens element 610 is made of plastic material, and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material, and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third tens element 630 is made of plastic material, and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material, and has the object-side surface 641 and the image-side surface 642 being both aspheric. Furthermore, the image-side surface 642 of the fourth lens element 640 includes at least one inflection point and at least one critical point in an off-axis region thereof.

The IR-cut filter 650 is made of glass material, which is located between the fourth lens element 640 and the image surface 660 in order, and will not affect the focal length of the image capturing optical lens system.

The detailed optical data of the 6th embodiment are shown in Table 11 and the aspheric surface data are shown in Table 12 below.

TABLE 11

6th Embodiment
f = 19.65 mm, Fno = 3.57, HFOV = 9.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.948 | ASP | 2.357 | Plastic | 1.544 | 56.0 | 10.21 |
| 2 | | −13.279 | ASP | 0.050 | | | | |
| 3 | Lens 2 | −19.410 | ASP | 1.346 | Plastic | 1.639 | 23.5 | −12.84 |
| 4 | | 14.576 | ASP | 0.220 | | | | |
| 5 | Ape. Stop | Plano | | 6.096 | | | | |

TABLE 11-continued

6th Embodiment
f = 19.65 mm, Fno = 3.57, HFOV = 9.4 deg.

| Surface # | | Curvature Radius | Thickness | | Material | Index | Abbe # | Focal Length |
|---|---|---|---|---|---|---|---|---|
| 6 | Lens 3 | 9.369 | ASP | 2.049 | Plastic | 1.686 | 18.4 | 15.29 |
| 7 | | 79.914 | ASP | 3.830 | | | | |
| 8 | Lens 4 | −38.844 | ASP | 0.622 | Plastic | 1.704 | 14.0 | −10.75 |
| 9 | | 9.465 | ASP | 4.000 | | | | |
| 10 | IR-cut filter | Plano | | 0.210 | Glass | 1.517 | 64.2 | — |
| 11 | | Plano | | 0.676 | | | | |
| 12 | Image | Plano | | — | | | | |

Reference wavelength is 587.6 nm (d-line).

TABLE 12

Aspheric Coefficients

| Surface # | 1 | 2 | 3 | 4 |
|---|---|---|---|---|
| k= | 5.9507E−01 | 0.0000E+00 | 0.0000E+00 | −3.2707E+01 |
| A4= | −8.8785E−06 | 2.6045E−04 | −1.6730E−03 | −7.7081E−04 |
| A6= | 3.3324E−06 | 5.8615E−05 | 1.3190E−04 | −4.0313E−06 |
| A8= | −1.7636E−06 | −3.5778E−05 | −1.0591E−05 | 4.1554E−05 |
| A10= | −5.8212E−08 | 7.4250E−06 | −3.9711E−07 | −1.4088E−05 |
| A12= | 6.7254E−08 | −7.5316E−08 | 1.0763E−06 | 2.6805E−06 |
| A14= | −8.4833E−09 | −1.1700E−07 | −2.0899E−07 | −2.7661E−07 |
| A16= | 3.3037E−10 | 8.5548E−09 | 1.1800E−08 | 1.1878E−08 |

| Surface# | 6 | 7 | 8 | 9 |
|---|---|---|---|---|
| k= | 0.0000E+00 | 0.0000E+00 | 0.0000E+00 | 0.0000E+00 |
| A4= | −7.3040E−04 | −1.1632E−03 | −1.6055E−02 | −1.5543E−02 |
| A6= | −8.0747E−06 | 4.4633E−06 | 1.7845E−03 | 2.2583E−03 |
| A8= | 1.0747E−06 | −4.2799E−07 | −1.6293E−04 | −2.8613E−04 |
| A10= | −5.6075E−07 | −4.1366E−07 | 9.9086E−06 | 3.0567E−05 |
| A12= | 9.9569E−08 | 1.0149E−07 | 1.8061E−07 | −2.3232E−06 |
| A14= | −8.7297E−09 | −1.0262E−08 | −8.3706E−08 | 1.0464E−07 |
| A16= | 2.8394E−10 | 3.6520E−10 | 4.0992E−09 | −2.0767E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 19.65 | ΣAT/T23 | 1.61 |
| Fno | 3.57 | TL/f | 1.09 |
| HFOV [degrees] | 9.4 | Td/BL | 3.39 |
| tan(2 × HFOV) | 0.34 | ImgH/EPD | 0.60 |
| V2 + V3 | 41.9 | (R5 + R6)/(R5 − R6) | −1.27 |
| Vmin | 14.0 | (f/R1) + (f/R4) | 3.54 |
| V1/N1 | 36.26 | f/|R7| + f/|R8| | 2.58 |
| V2/N2 | 14.34 | f/ImgH | 5.99 |
| V3/N3 | 10.90 | (|f/f1| + |f/f2|)/(|f/f3| + |f/f4|) | 1.11 |
| V4/N4 | 8.22 | f2/f4 | 1.19 |
| CT1/CT2 | 1.75 | Y11/ImgH | 0.96 |

7TH EMBODIMENT

Figure 13:
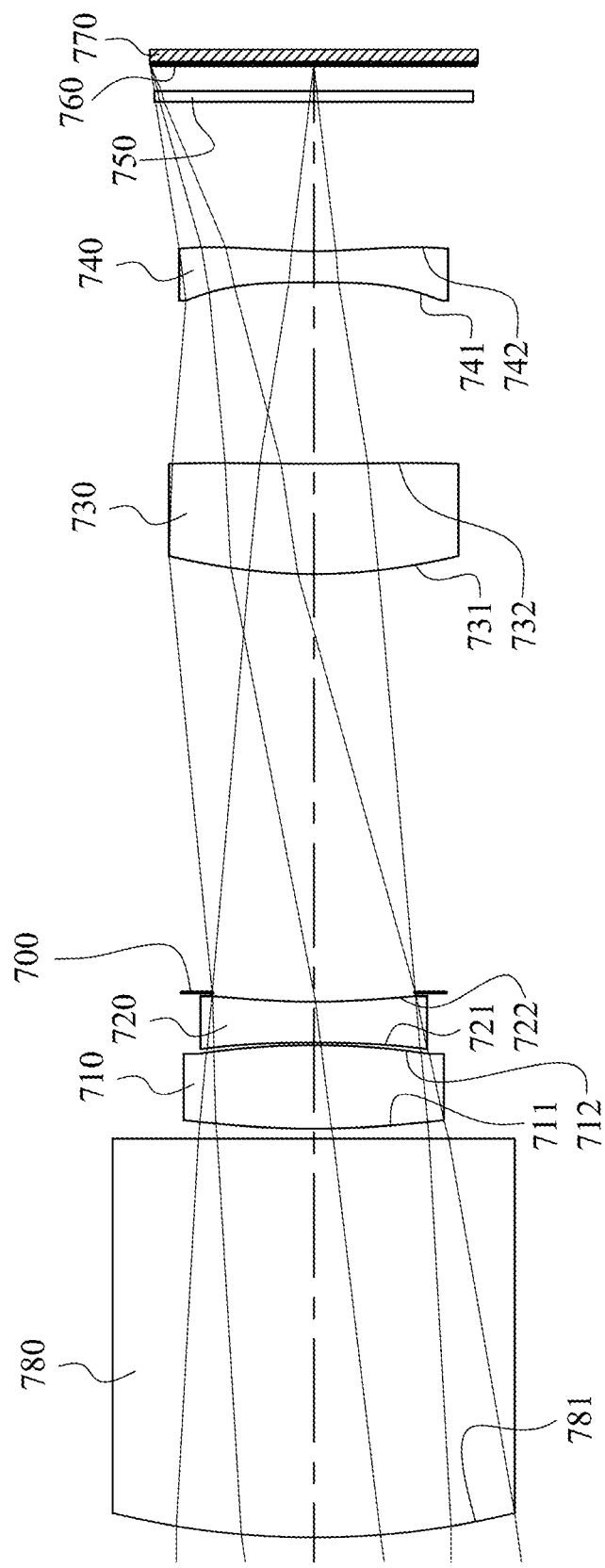
FIG. 13 is a schematic view of an imaging apparatus according to the 7th embodiment of the present disclosure.
Figure 14:
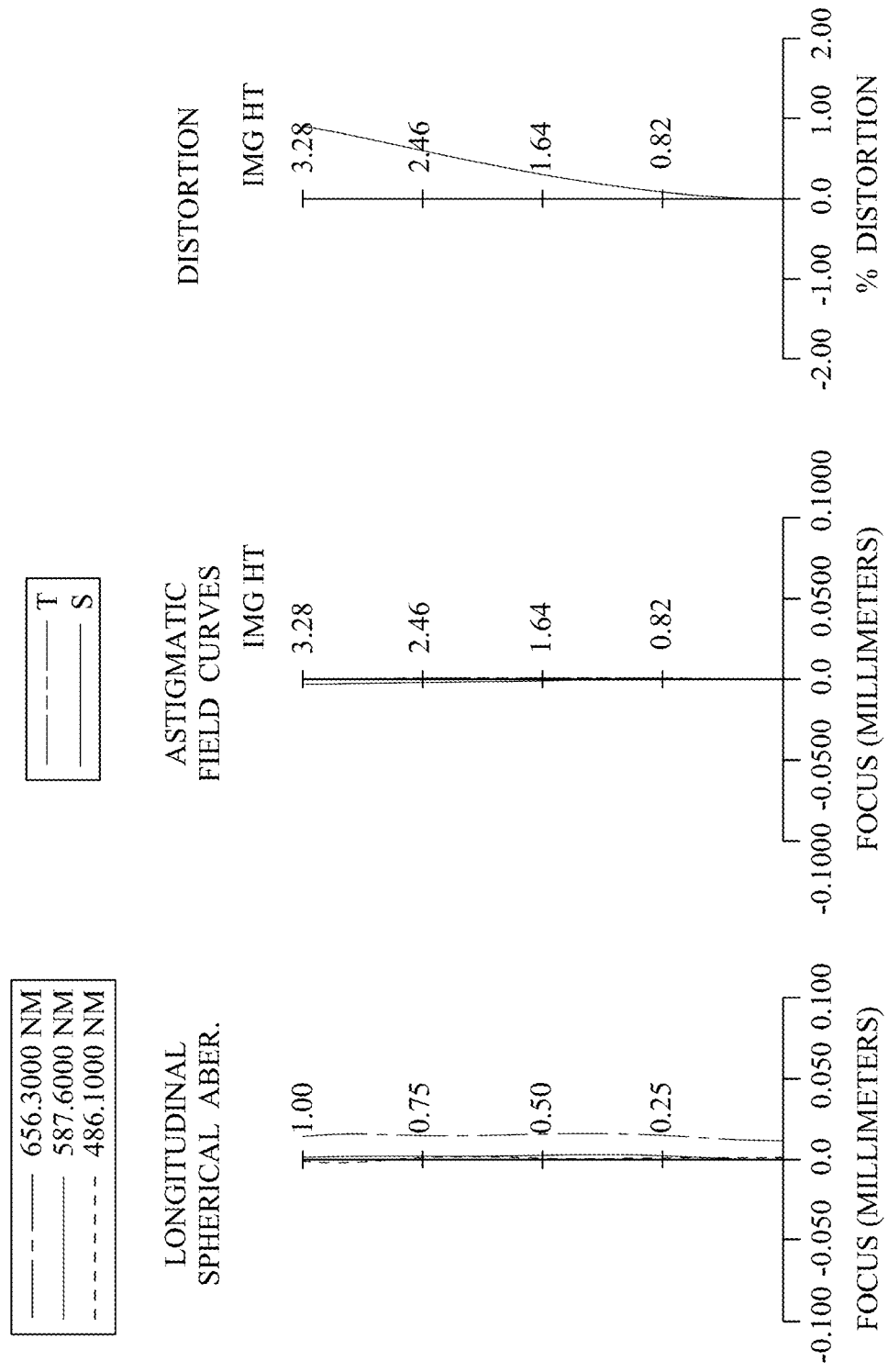
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing optical lens system (its reference numeral is omitted) and an image sensor 770. The image capturing optical lens system includes, in order from an object side to an image side along an optical path, a reflective element 780, a first lens element 710, a second lens element 720, an aperture stop 700, a third lens element 730, a fourth lens element 740, a IR-cut filter 750 and an image surface 760, wherein the image sensor 770 is disposed on the image surface 760 of the image capturing optical lens system. The image capturing optical lens system includes four lens elements (710, 720, 730, 740) without additional one or more lens elements inserted between the first lens element 710 and the fourth lens element 740.

The first lens element 710 with positive refractive power has an object-side surface 711 being convex in a paraxial region thereof and an image-side surface 712 being convex in a paraxial region thereof. The first lens element 710 is made of plastic material, and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material, and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of plastic material, and has the object-side surface 741 and the image-side surface 742 being both aspheric. Furthermore, the image-side surface 742 of the fourth lens element 740 includes at least one inflection point and at least one critical point in an off-axis region thereof.

The IR-cut filter 750 is made of glass material, which is located between the fourth lens element 740 and the image surface 760 in order, and will not affect the focal length of the image capturing optical lens system.

The reflective element 780 is disposed on an object side of the first lens element 710 along the optical path, wherein the reflective element 780 has positive refractive power, one surface 781 of the reflective element 780 facing towards an imaged object is convex in a paraxial region thereof. The reflective element 780 is made of plastic material.

The detailed optical data of the 7th embodiment are shown in Table 13 and the aspheric surface data are shown in Table 14 below.

TABLE 13

7th Embodiment
f = 23.09 mm, Fno = 4.20, HFOV = 8.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | 17.129 | | 8.000 | Plastic | 1.534 | 56.0 | 32.06 |
| 2 | | Plano | | 0.200 | | | | |
| 3 | Lens 1 | 19.411 | ASP | 1.671 | Plastic | 1.534 | 56.0 | 16.20 |
| 4 | | −15.150 | ASP | 0.050 | | | | |
| 5 | Lens 2 | −28.667 | ASP | 0.827 | Plastic | 1.634 | 23.8 | −14.79 |
| 6 | | 14.096 | ASP | 0.184 | | | | |
| 7 | Ape. Stop | Plano | | 8.392 | | | | |
| 8 | Lens 3 | 10.843 | ASP | 2.222 | Plastic | 1.678 | 17.6 | 18.27 |
| 9 | | 79.914 | ASP | 3.637 | | | | |
| 10 | Lens 4 | −58.507 | ASP | 0.619 | Plastic | 1.704 | 14.0 | −11.66 |
| 11 | | 9.588 | ASP | 3.000 | | | | |
| 12 | IR-cut filter | Plano | | 0.210 | Glass | 1.516 | 64.2 | — |
| 13 | | Plano | | 0.555 | | | | |
| 14 | Image | Plano | | — | | | | |

Reference wavelength is 587.6 nm (d-line).

TABLE 14

Aspheric Coefficients

| Surface # | 3 | 4 | 5 | 6 |
|---|---|---|---|---|
| k= | −2.8524E+00 | 0.0000E+00 | 0.0000E+00 | −4.3351E+01 |
| A4= | −1.7842E−05 | 1.1673E−03 | −1.4985E−03 | −9.1057E−04 |
| A6= | 2.1560E−07 | −8.3078E−04 | −5.4902E−04 | −4.1964E−05 |
| A8= | −1.4869E−05 | 2.1616E−04 | 2.2378E−04 | 7.0557E−05 |
| A10= | 4.6001E−06 | −8.2765E−06 | −2.0336E−05 | −2.2061E−05 |
| A12= | −7.3799E−07 | −5.5607E−06 | −2.7154E−06 | 4.2236E−06 |
| A14= | 5.9198E−08 | 8.9193E−07 | 5.7089E−07 | −4.9909E−07 |
| A16= | −1.9946E−09 | −4.1872E−08 | −2.6650E−08 | 2.6751E−08 |

| Surface# | 8 | 9 | 10 | 11 |
|---|---|---|---|---|
| k= | 0.0000E+00 | 0.0000E+00 | 0.0000E+00 | 0.0000E+00 |
| A4= | −5.2375E−04 | −9.5231E−04 | −1.3183E−02 | −1.3049E−02 |
| A6= | 1.3809E−05 | 3.6623E−05 | 1.4673E−03 | 1.7879E−03 |
| A8= | −1.1965E−06 | −2.6363E−06 | −1.1231E−04 | −2.0272E−04 |
| A10= | −1.2228E−07 | −2.7991E−07 | 6.2188E−07 | 1.6560E−05 |
| A12= | 3.9502E−08 | 8.6377E−08 | 9.2207E−07 | −8.5939E−07 |
| A14= | −3.3605E−09 | −7.3717E−09 | −8.6284E−08 | 2.4059E−08 |
| A16= | 9.1404E−11 | 2.0717E−10 | 2.5080E−09 | −2.7470E−10 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 23.09 | ΣAT/T23 | 1.43 |
| Fno | 4.20 | TL/f | 0.93 |
| HFOV [degrees] | 8.0 | Td/BL | 4.67 |
| tan(2 × HFOV) | 0.29 | ImgH/EPD | 0.60 |
| V2 + V3 | 41.5 | (R5 + R6)/(R5 − R6) | −1.31 |
| Vmin | 14.0 | (f/R1) + (f/R4) | 2.83 |
| V1/N1 | 36.48 | f/|R7| + f/|R8| | 2.80 |
| V2/N2 | 14.59 | f/ImgH | 7.04 |
| V3/N3 | 10.51 | (|f/f1| + |f/f2|)/(|f/f3| + |f/f4|) | 0.92 |
| V4/N4 | 8.22 | f2/f4 | 1.27 |
| CT1/CT2 | 2.02 | Y11/ImgH | 0.79 |
| Tgp | 143.00 | Tgp/Np | 93.23 |

Figure 18:
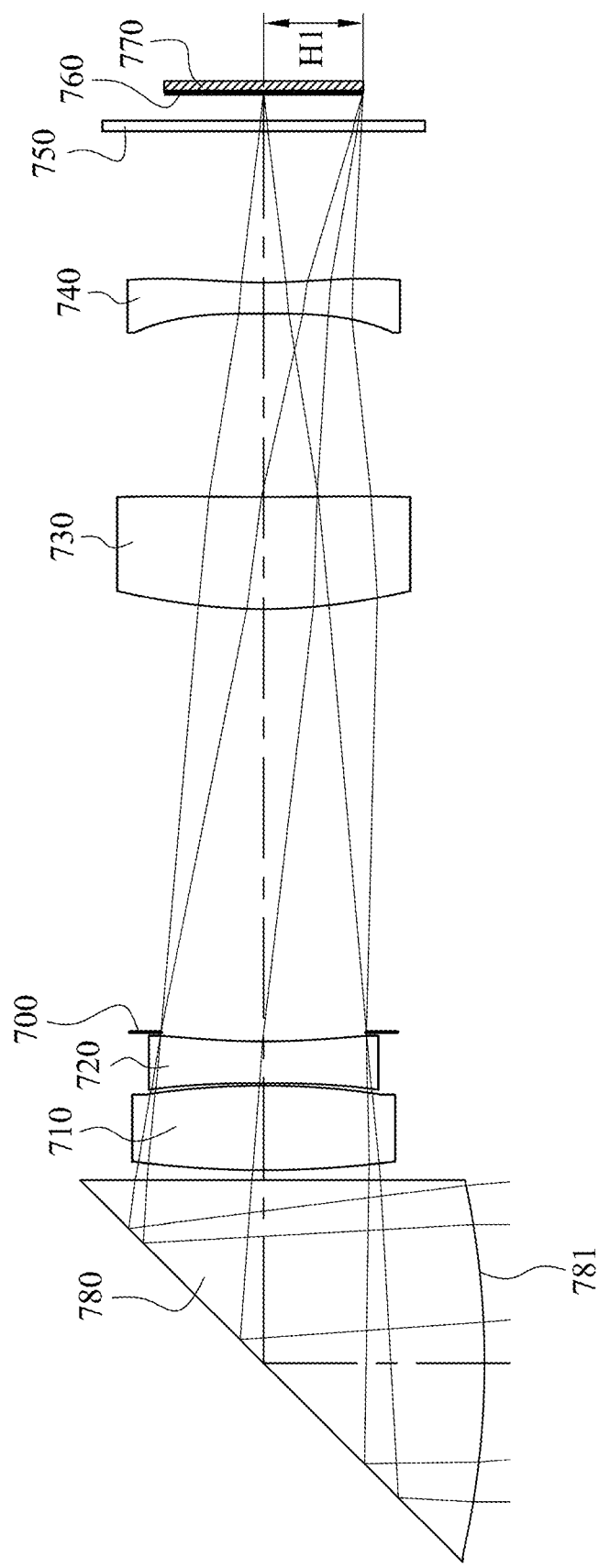
FIG. 18 is a schematic view of the imaging apparatus with another reflective element according to the 7th embodiment of the present disclosure.

Furthermore, FIG. 18 is a schematic view of the imaging apparatus with another reflective element 780 according to the 7th embodiment of the present disclosure. In FIG. 18, the reflective element 780 is disposed on the object side of the first lens element 710 along the optical path, and is a prism for folding the incident light. It should be mentioned that a maximum image height H1 of the incident light folded by the reflective element 780 is 0.6 times of a maximum image height without the reflective element 780, but the present disclosure is not limited thereto.

8TH EMBODIMENT

Figure 15:
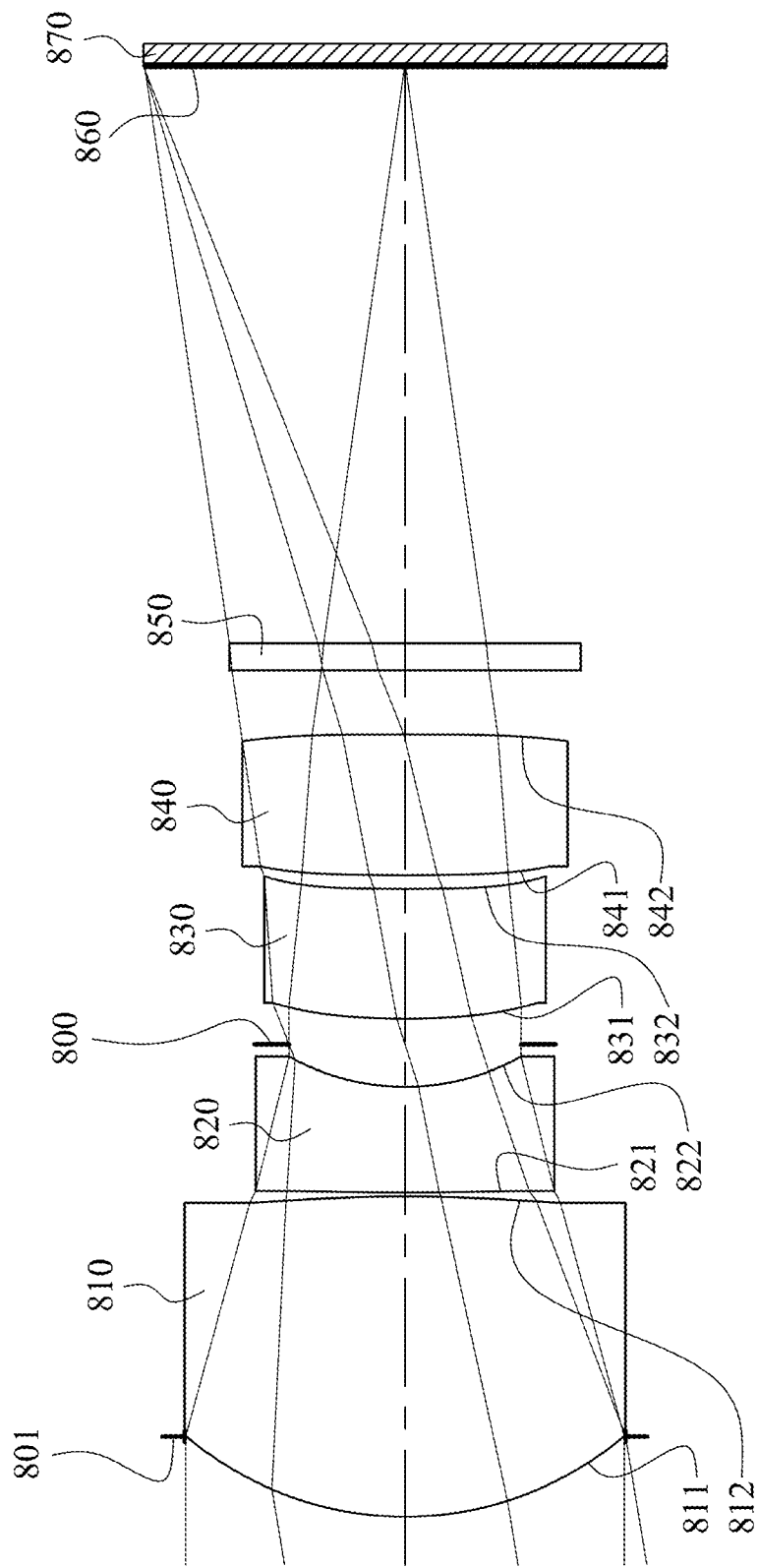
FIG. 15 is a schematic view of an imaging apparatus according to the 8th embodiment of the present disclosure.
Figure 16:
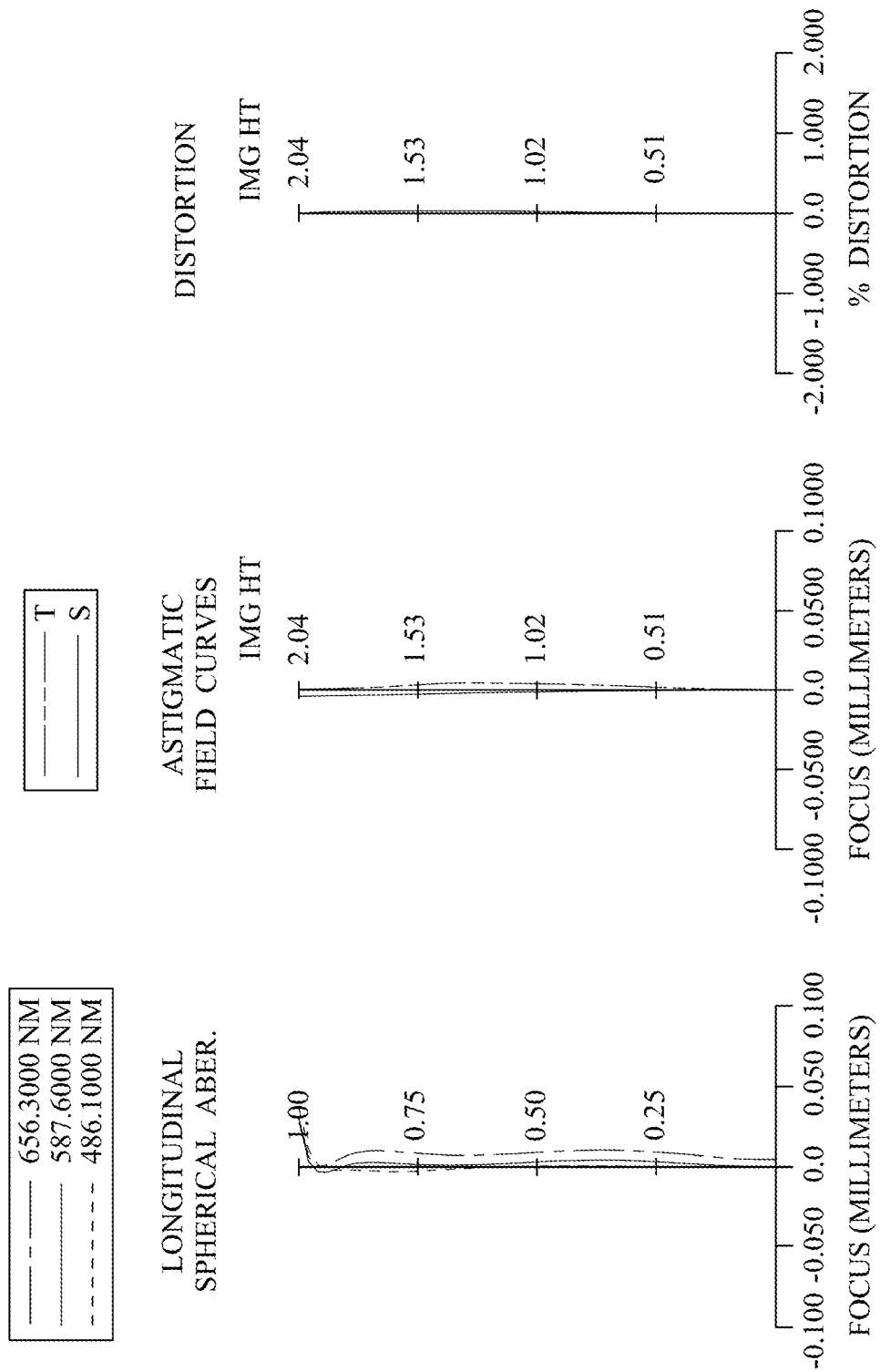
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an image capturing optical lens system (its reference numeral is omitted) and an image sensor 870. The image capturing optical lens system includes, in order from an object side to an image side along an optical path, a stop 801, a first lens element 810, a second lens element 820, an aperture stop 800, a third lens element 830, a fourth lens element 840, a IR-cut filter 850 and an image surface 860, wherein the image sensor 870 is disposed on the image surface 860 of the image capturing optical lens system. The image capturing optical lens system includes four lens elements (810, 820, 830, 840) without additional one or more lens elements inserted between the first lens element 810 and the fourth lens element 840.

The first lens element 810 with positive refractive power has an object-side surface 811 being convex in a paraxial region thereof and an image-side surface 812 being convex in a paraxial region thereof. The first lens element 810 is made of plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material, and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material, and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material, and has the object-side surface 841 and the image-side surface 842 being both aspheric.

The IR-cut filter 850 is made of glass material, which is located between the fourth lens element 840 and the image surface 860 in order, and will not affect the focal length of the image capturing optical lens system.

The detailed optical data of the 8th embodiment are shown in Table 15 and the aspheric surface data are shown in Table 16 below.

TABLE 15

8th Embodiment
f = 12.30 mm, Fno = 3.60, HFOV = 9.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.625 | | | | |
| 2 | Lens 1 | 2.617 | ASP | 2.500 | Plastic | 1.544 | 55.9 | 4.13 |
| 3 | | −10.524 | ASP | 0.030 | | | | |
| 4 | Lens 2 | 23.415 | ASP | 0.827 | Glass | 1.839 | 23.9 | −2.40 |
| 5 | | 1.823 | ASP | 0.330 | | | | |
| 6 | Ape. Stop | Plano | | 0.200 | | | | |
| 7 | Lens 3 | 6.062 | ASP | 1.013 | Plastic | 1.704 | 14.0 | 11.98 |
| 8 | | 20.072 | ASP | 0.109 | | | | |
| 9 | Lens 4 | 17.200 | ASP | 1.100 | Plastic | 1.584 | 28.2 | 25.20 |
| 10 | | −100.000 | ASP | 0.500 | | | | |
| 11 | IR-cut filter | Plano | | 0.210 | Glass | 1.517 | 64.2 | — |
| 12 | | Plano | | 4.508 | | | | |
| 13 | Image | Plano | | — | | | | |

Reference wavelength is 587.6 nm (d-line).
Effective radius of Surface 1 (Stop 801) is 1.720 mm.

TABLE 16

| Aspheric Coefficients | | | | |
|---|---|---|---|---|
| Surface# | 2 | 3 | 4 | 5 |
| k= | −3.7079E−02 | 0.0000E+00 | 0.0000E+00 | −1.1687E+00 |
| A4= | −3.0083E−04 | 3.6269E−02 | 2.0681E−03 | 8.9150E−03 |
| A6= | 1.8716E−06 | −8.9619E−02 | −5.8054E−02 | −5.8307E−03 |
| A8= | −2.0284E−05 | 1.4222E−01 | 9.2919E−02 | 2.1259E−02 |
| A10= | −2.1550E−05 | −1.1977E−01 | −6.0577E−02 | 1.9508E−02 |
| A12= | 1.2416E−05 | 5.6369E−02 | 1.3120E−02 | 6.3503E−03 |
| A14= | −2.2556E−06 | −1.5231E−02 | 1.7719E−03 | −6.1589E−02 |
| A16= | | 1.9304E−03 | −8.2882E−04 | 3.5625E−02 |
| Surface# | 7 | 8 | 9 | 10 |
| k= | 0.0000E+00 | 0.0000E+00 | 0.0000E+00 | 0.0000E+00 |
| A4= | 3.4450E−02 | 4.6515E−02 | 1.0745E−02 | −2.0278E−02 |
| A6= | −1.4202E−02 | −3.1379E−02 | −2.0807E−02 | 1.2707E−03 |
| A8= | 1.3390E−03 | 1.0290E−02 | −9.2100E−03 | −3.9188E−04 |
| A10= | 3.9190E−02 | 6.4560E−02 | 9.8966E−02 | 1.0269E−03 |
| A12= | −3.4280E−02 | −3.6504E−02 | −8.1078E−02 | 1.9862E−04 |
| A14= | 2.2093E−03 | −1.7447E−02 | 1.6010E−02 | −5.9930E−04 |
| A16= | 4.0198E−03 | 1.0948E−02 | 1.4588E−03 | 1.6612E−04 |

In the 8TH embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 12.30 | ΣAT/T23 | 1.26 |
| Fno | 3.60 | TL/f | 0.92 |
| HFOV [degrees] | 9.4 | Td/BL | 1.17 |
| tan(2 × HFOV) | 0.34 | ImgH/EPD | 0.60 |
| V2 + V3 | 37.9 | (R5 + R6)/(R5 − R6) | −1.87 |
| Vmin | 14.0 | (f/R1) + (f/R4) | 11.45 |
| V1/N1 | 36.23 | f/|R7| + f/|R8| | 0.84 |
| V2/N2 | 12.97 | f/ImgH | 6.03 |
| V3/N3 | 8.22 | (|f/f1| + |f/f2|)/(|f/f3| + |f/f4|) | 5.35 |
| V4/N4 | 17.83 | f2/f4 | −0.10 |
| CT1/CT2 | 3.02 | Y11/ImgH | 0.84 |

9TH EMBODIMENT

Figure 19B:
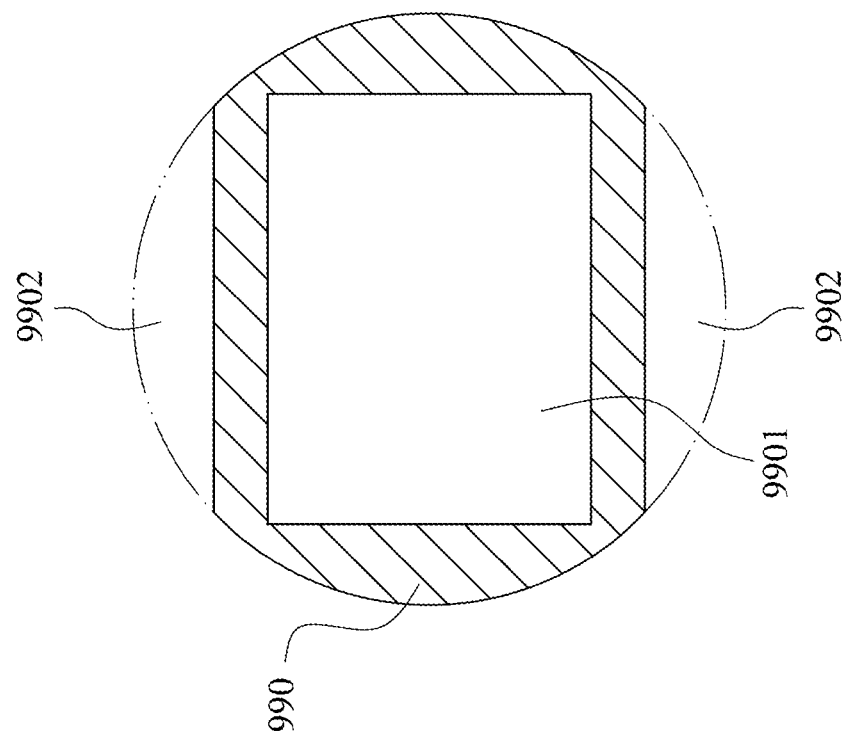
FIG. 19B is a schematic view of another light blocking element of the imaging apparatus according to the 9th embodiment of present disclosure.
Figure 19A:
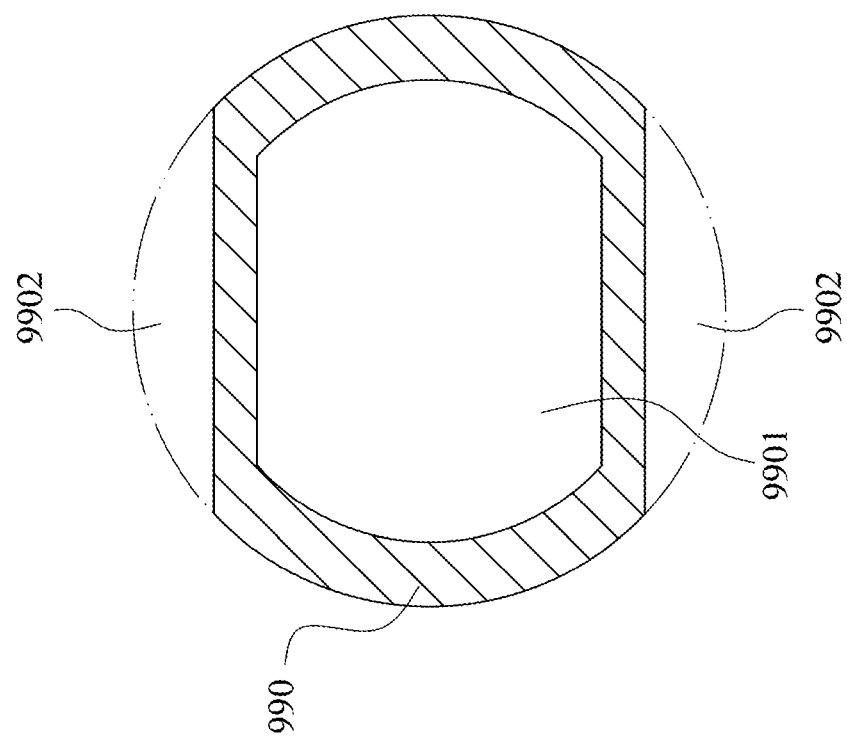
FIG. 19A is a schematic view of a light blocking element of an imaging apparatus according to the 9th embodiment of present disclosure.

FIG. 19A and FIG. 19B are schematic views of light blocking elements 990 of an imaging apparatus according to the 9th embodiment of present disclosure. In FIG. 19A and FIG. 19B, the imaging apparatus can includes the light blocking element 990, which can be disposed the image capturing optical lens system of the imaging apparatus of any one of the 1st to the 8th embodiment, and can be disposed between any two adjacent elements, but the present disclosure will not be limited thereto.

In detail, in FIG. 19A, the light blocking element 990 includes an opening 9901 and two cutting side portions 9902, wherein two sides of the opening 9901 in FIG. 19A are arc-shaped; in FIG. 19B, the light blocking element 990 includes an opening 9901 and two cutting side portions 9902, wherein the opening 9901 in FIG. 19B is square-shaped. In FIG. 19A and FIG. 19B, the light blocking elements 990 have different shapes of non-circular inner holes, but the present disclosure will not be limited thereto.

10TH EMBODIMENT

Figure 20:
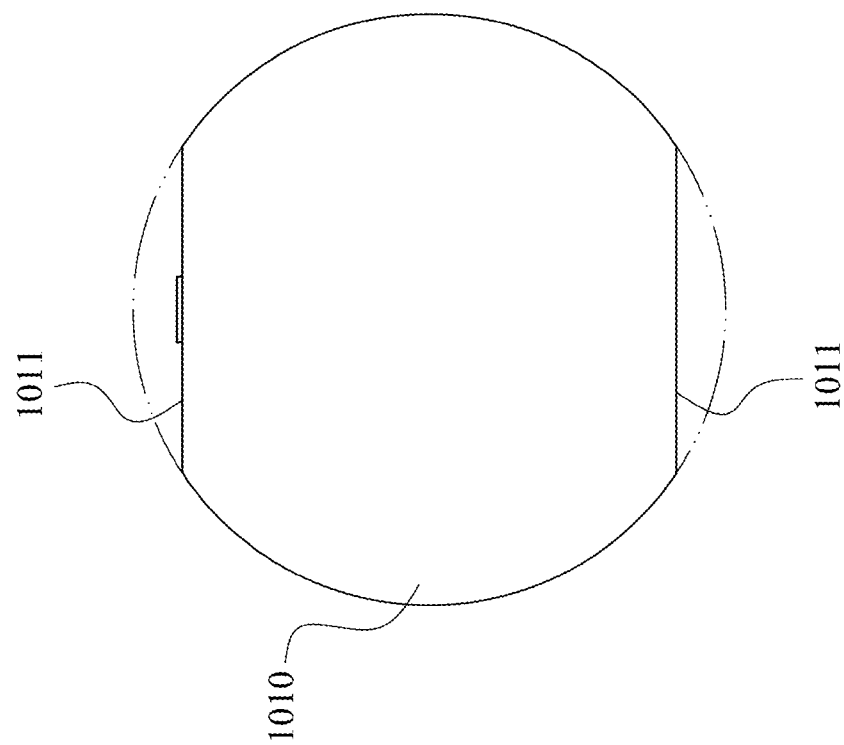
FIG. 20 is a schematic view of a first lens element of an imaging apparatus according to the 10th embodiment of present disclosure.

FIG. 20 is a schematic view of a first lens element 1010 of an imaging apparatus according to the 10th embodiment of present disclosure. In FIG. 20, the arrangement of the imaging apparatus is the same with the arrangement of the imaging apparatus according to the aforementioned 4th embodiment, except the first lens element 1010 includes two uniaxial trimmed sides 1011, which form a non-circular lens element, but the present disclosure will not be limited thereto.

11TH EMBODIMENT

Figure 21:
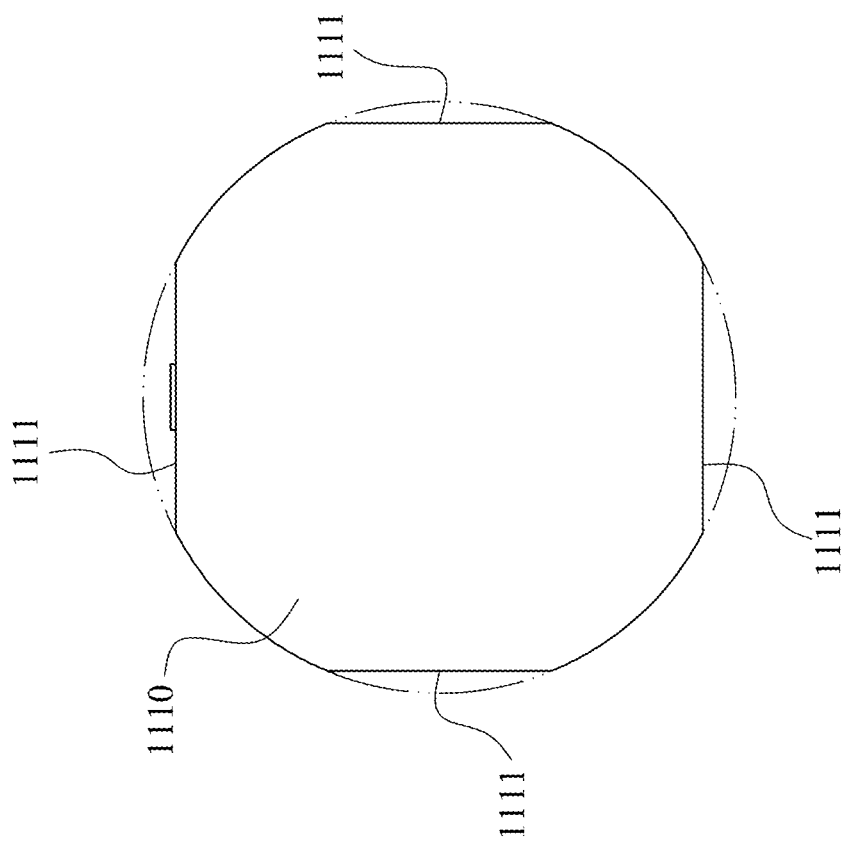
FIG. 21 is a schematic view of a first lens element of an imaging apparatus according to the 11th embodiment of present disclosure.

FIG. 21 is a schematic view of a first lens element 1110 of an imaging apparatus according to the 11th embodiment of present disclosure. In FIG. 21, the arrangement of the imaging apparatus is the same with the arrangement of the imaging apparatus according to the aforementioned 1st embodiment, except the first lens element 1110 includes four uniaxial trimmed sides 1111, which form a non-circular lens element, but the present disclosure will not be limited thereto.

12TH EMBODIMENT

Figure 22:
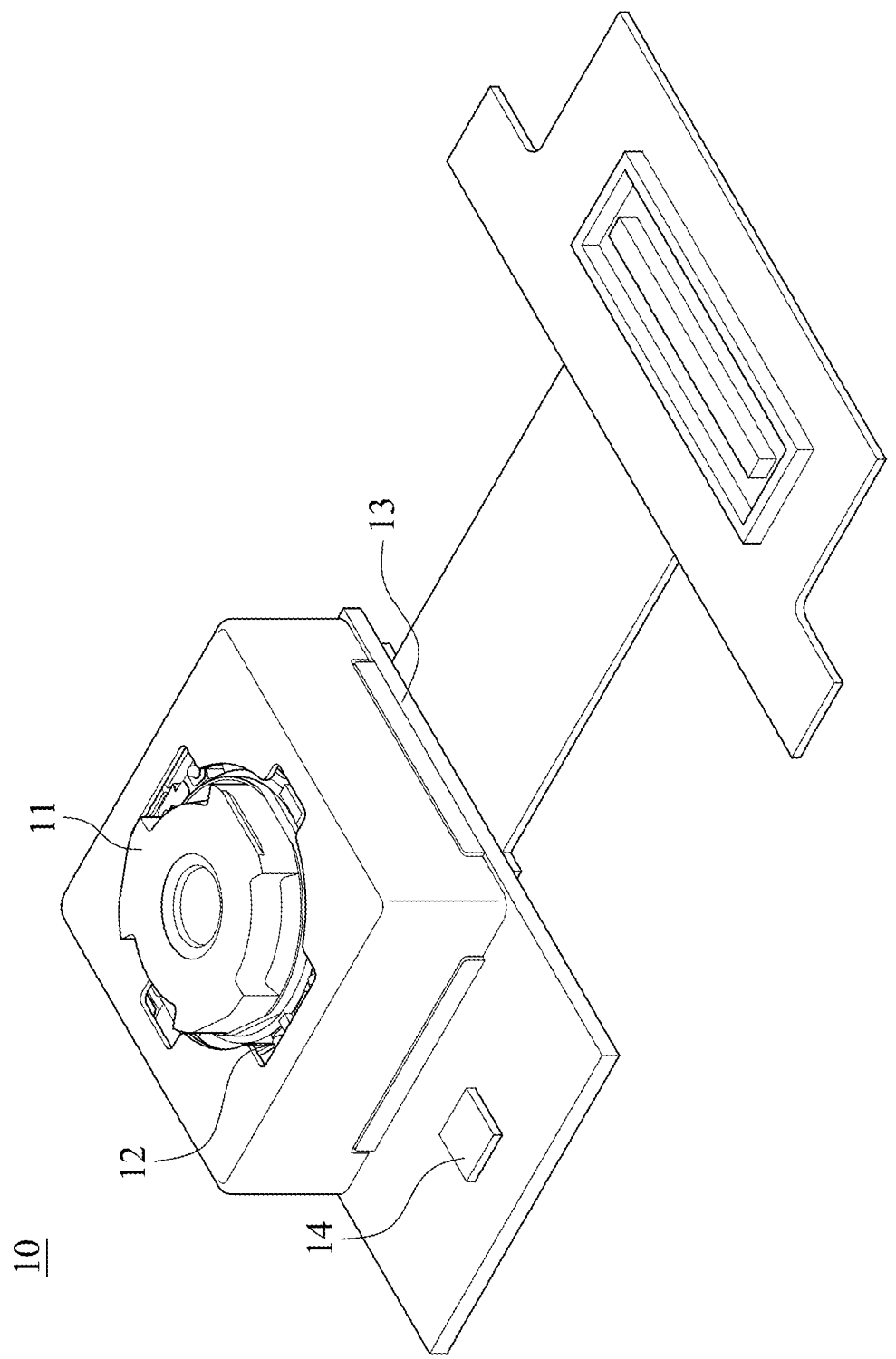
FIG. 22 is a schematic view of an imaging apparatus according to the 12th embodiment of the present disclosure.

FIG. 22 is a schematic view of an imaging apparatus 10 according to the 12th embodiment of the present disclosure. In FIG. 22, the imaging apparatus 10 of the 12th embodiment is a camera module, the imaging apparatus 10 includes an imaging lens assembly 11, a driving apparatus 12 and an image sensor 13, wherein the imaging lens assembly 11 includes the image capturing optical lens system of the present disclosure and a lens barrel (not shown in drawings) for carrying the image capturing optical lens system. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image capturing optical lens system can obtain a favorable imaging position by the driving apparatus 12 so as to capture clear images when the imaged object is disposed at different object distances.

The imaging apparatus 10 can include the image sensor 13 located on the image surface of the image capturing lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 12th embodiment, the image stabilization module 14 is a gyro sensor, but is not limited thereto. Therefore, the variation of different axial directions of the image capturing optical lens system can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

13th Embodiment

Figure 23A:
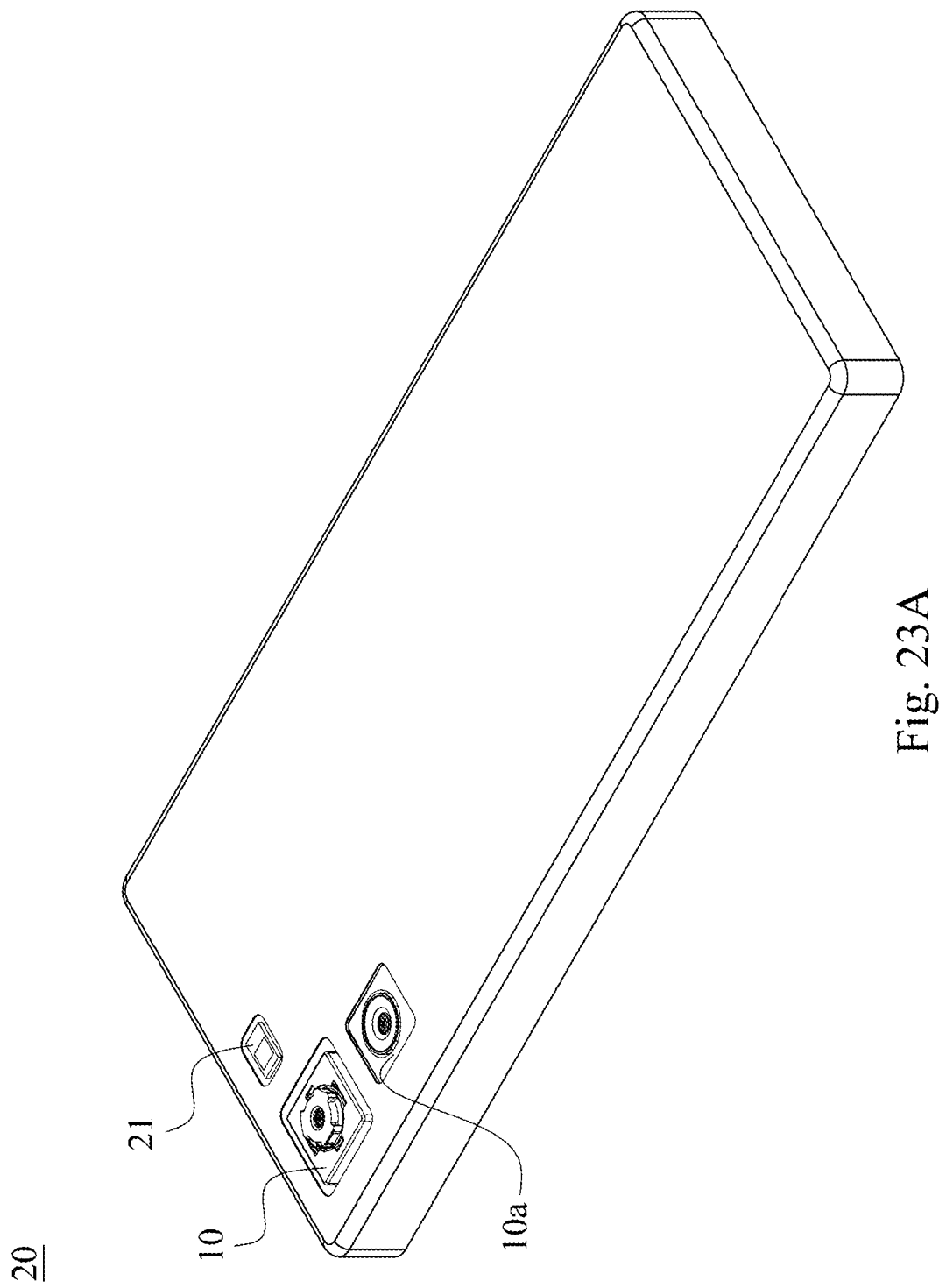
FIG. 23A is a schematic view of one side of an electronic device according to the 13th embodiment of the present disclosure.
Figure 23B:
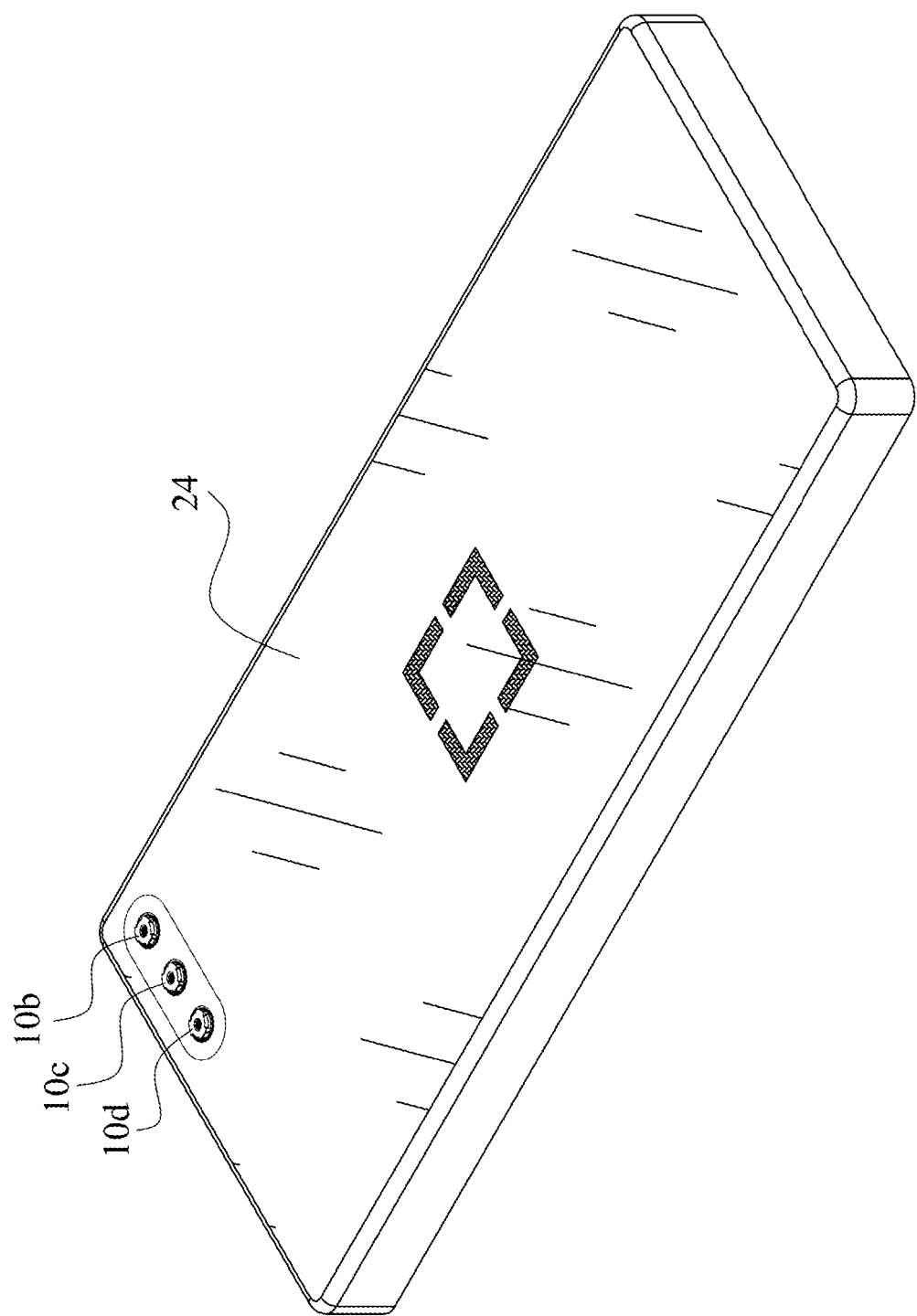
FIG. 23B is a schematic view of another side of the electronic device of FIG. 23A.
Figure 23C:
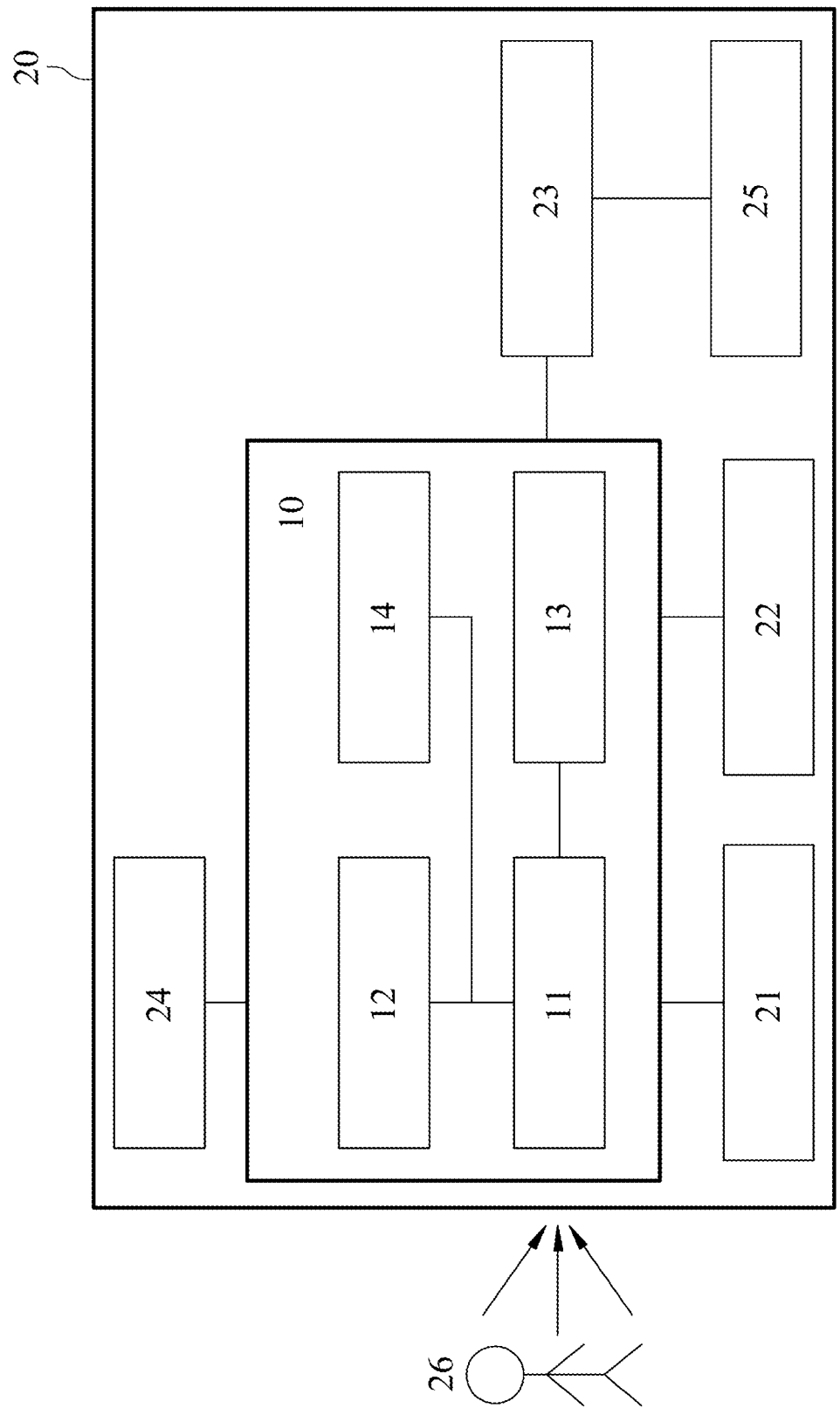
FIG. 23C is a system schematic view of the electronic device of FIG. 23A.

FIG. 23A is a schematic view of one side of an electronic device 20 according to the 13th embodiment of the present disclosure. FIG. 23B is a schematic view of another side of the electronic device 20 of FIG. 23A. FIG. 23C is a system schematic view of the electronic device 20 of FIG. 23A. In FIGS. 23A, 23B and 23C, the electronic device 20 according to the 13th embodiment is a smartphone, which include imaging apparatuses 10, 10a, 10b, 10c, 10d, a flash module 21, a focusing assisting module 22, an image signal processor (ISP) 23, a user interface 24 and an image software processor 25, wherein each of the imaging apparatuses 10b, 10c, 10d is a front camera. When the user captures images of an imaged object 26 via the user interface 24, the electronic device 20 focuses and generates an image via at least one of the imaging apparatuses 10, 10a, 10b, 10c, 10d while compensating for low illumination via the flash module 21 when necessary. Then, the electronic device 20 quickly focuses on the imaged object 26 according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

Each of the imaging apparatuses 10, 10a, 10b, 10c, 10d according to the 13th embodiment can include the image capturing optical lens system of the present disclosure, and can be the same or similar to the imaging apparatus 10 according to the aforementioned 12th embodiment, and will not describe again herein. In detail, according to the 13th embodiment, the imaging apparatuses 10, 10a can be wide angle imaging apparatus and ultra-wide angle imaging apparatus, respectively. The imaging apparatuses 10b, 10c, 10d can be wide angle imaging apparatus, ultra-wide angle imaging apparatus and TOF (Time-Of-Flight) module, respectively, which will not be limited thereto. Further, the connecting relationships between each of the imaging apparatuses 10a, 10b, 10c, 10d and other elements can be the same as the imaging apparatus 10 in FIG. 23C, or can be adaptively adjusted according to the type of the imaging apparatuses, which will not be shown and detailed descripted again.

14TH EMBODIMENT

Figure 24:
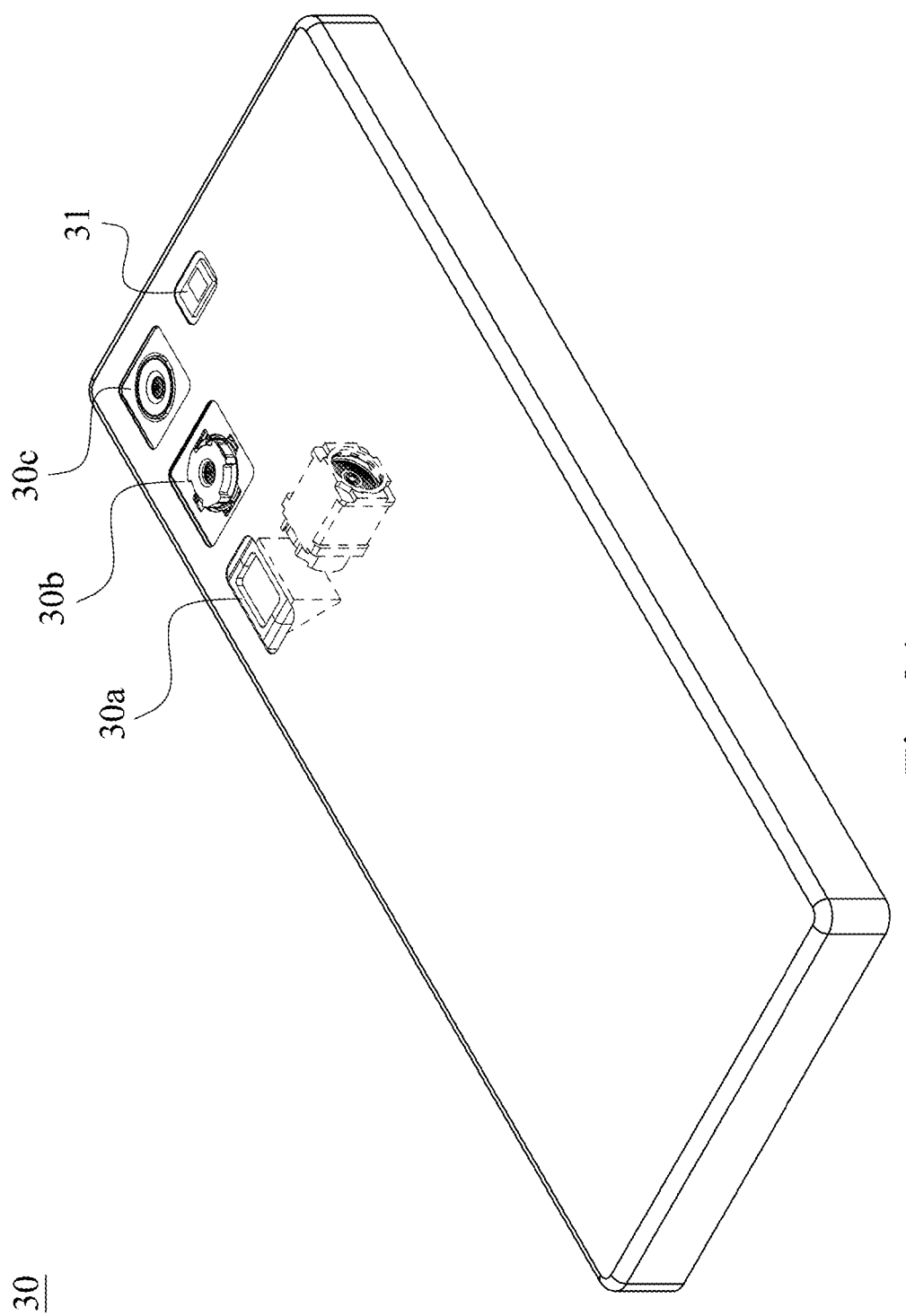
FIG. 24 is a schematic view of one side of an electronic device according to the 14th embodiment of the present disclosure.

FIG. 24 is a schematic view of one side of an electronic device 30 according to the 14th embodiment of the present disclosure. According to the 14th embodiment, the electronic device 30 is a smartphone, which include imaging apparatuses 30a, 30b, 30c and a flash module 31.

The electronic device 30 according to the 14th embodiment can include the same or similar elements to that according to the 13th embodiment, and each of the imaging apparatuses 30a, 30b, 30c according to the 14th embodiment can have a configuration which is the same or similar to that according to the 13th embodiment, and will not describe again herein. In detail, according to the 14th embodiment, each of the imaging apparatuses 30a, 30b, 30c can include the image capturing optical lens system of the present disclosure, and can be the same or similar to the imaging apparatus 10 according to the aforementioned 12th embodiment, and will not describe again herein. In detail, the imaging apparatuses 30a, 30b, 30c can be ultra-wide angle imaging apparatus, wide angle imaging apparatus and telephoto imaging apparatus (which can include light path folding element), respectively, or can be adaptively adjusted according to the type of the imaging apparatuses, which will not be limited to the arrangement.

15TH EMBODIMENT

Figure 25:
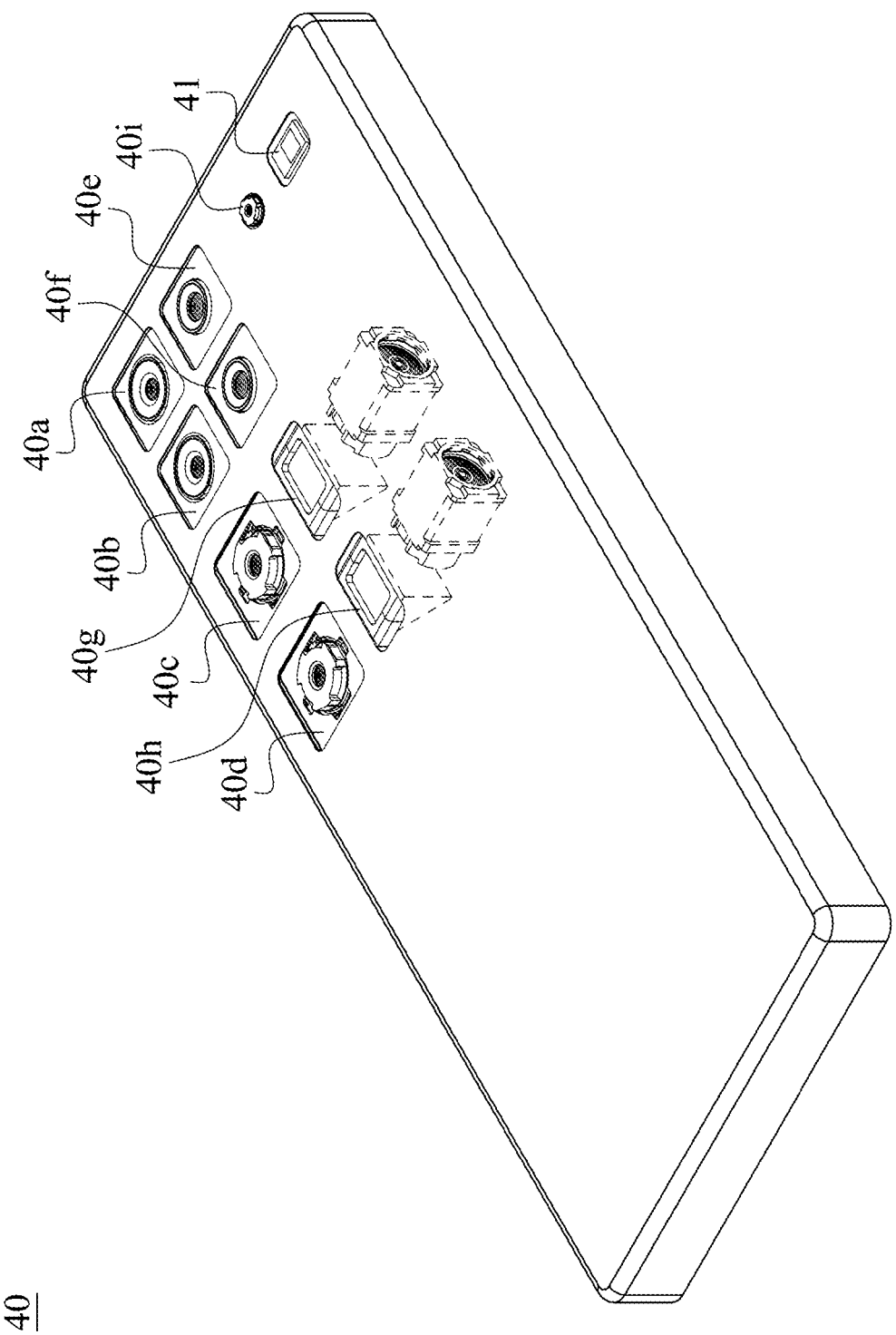
FIG. 25 is a schematic view of one side of an electronic device according to the 15th embodiment of the present disclosure.

FIG. 25 is a schematic view of one side of an electronic device 40 according to the 15th embodiment of the present disclosure. According to the 15th embodiment, the electronic device 40 is a smartphone, which include imaging apparatuses 40a, 40b, 40c, 40d, 40e, 40f, 40g, 40h, 40i and a flash module 41.

The electronic device 40 according to the 15th embodiment can include the same or similar elements to that according to the 13th embodiment, and each of the imaging apparatuses 40a, 40b, 40c, 40d, 40e, 40f, 40g, 40h, 40i and the flash module 41 can have a configuration which is the same or similar to that according to the 13th embodiment, and will not describe again herein. In detail, according to the 15th embodiment, each of the imaging apparatuses 40a, 40b, 40c, 40d, 40e, 40f, 40g, 40h, 40i can include the image capturing optical lens system of the present disclosure, and can be the same or similar to the imaging apparatus 10 according to the aforementioned 12th embodiment, and will not describe again herein.

In detail, each of the imaging apparatuses 40a, 40b can be ultra-wide angle imaging apparatus, each of the imaging apparatuses 40c, 40d can be wide angle imaging apparatus, each of the imaging apparatuses 40e, 40f can be telephoto imaging apparatus, each of the imaging apparatuses 40g, 40h can be telephoto imaging apparatus (which can include light path folding element), the imaging apparatus 40i can be TOF module, or can be adaptively adjusted according to the type of the imaging apparatuses, which will not be limited to the arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens system comprising four lens elements, the four lens elements being, in order from an object side to an image side along an optical path:
a first lens element, a second lens element, a third lens element and a fourth lens element;
wherein the first lens element has an object-side surface being convex in a paraxial region thereof;
the third lens element with positive refractive power has an object-side surface being convex in a paraxial region thereof and an image-side surface being concave in a paraxial region thereof;
the fourth lens element has negative refractive power;
wherein a curvature radius of the object-side surface of the third lens element is larger than a curvature radius of the object-side surface of the first lens element; an Abbe number of the second lens element is V2, an Abbe number of the third lens element is V3, a focal length of the image capturing optical lens system is f, a curvature radius of an object-side surface of the fourth lens element is R7, a curvature radius of an image-side surface of the fourth lens element is R8, a central thickness of the first lens element is CT1, a central thickness of the second lens element is CT2, an axial distance between the object-side surface of the first lens element and an image surface is TL, a sum of all axial distances between adjacent lens elements of the image capturing optical lens system is ΣAT, an axial distance between the second lens element and the third lens element is T23, and the following conditions are satisfied:

$10<V2+V3<70$;

$f/|R7|+f/|R8|<6.0$;

$0.30<CT1/CT2<3.0$; and $0.5<TL/f<1.0$; and $1.0<\Sigma AT/T23<2.5$.

2. The image capturing optical lens system of claim 1, wherein the focal length of the image capturing optical lens system is f, the curvature radius of the object-side surface of the fourth lens element is R7, the curvature radius of the image-side surface of the fourth lens element is R8, and the following condition is satisfied:

$f/|R7|+f/|R8|<5.0$.

3. The image capturing optical lens system of claim 1, wherein the Abbe number of the second lens element is V2, the Abbe number of the third lens element is V3, and the following condition is satisfied:

$15<V2+V3<50$.

4. The image capturing optical lens system of claim 1, wherein the sum of all axial distances between adjacent lens elements of the image capturing optical lens system is ΣAT, the axial distance between the second lens element and the third lens element is T23, and the following condition is satisfied:

$1.0<\Sigma AT/T23\leq 1.56$.

5. The image capturing optical lens system of claim 1, wherein a maximum distance between an optical effective region of the object-side surface of the first lens element and the optical axis is Y11, a maximum image height of the image capturing optical lens system is ImgH, and the following condition is satisfied:

$0.60<Y11/ImgH<1.20$.

6. The image capturing optical lens system of claim 1, wherein the focal length of the image capturing optical lens system is f, a focal length of the first lens element is f1, a focal length of the second lens element is f2, a focal length of the third lens element is f3, a focal length of the fourth lens element is f4, and the following condition is satisfied:

$2.0<(|f/f1|+|f/f2|)/(|f/f3|+|f/f4|)<8.0$.

7. The image capturing optical lens system of claim 1, wherein a maximum image height of the image capturing optical lens system is ImgH, an entrance pupil diameter of the image capturing optical lens system is EPD, and the following condition is satisfied:

$0.30<ImgH/EPD<0.80$.

8. The image capturing optical lens system of claim 1, wherein the second lens element has an image-side surface being concave in a paraxial region thereof; the focal length of the image capturing optical lens system is f, the curvature radius of the object-side surface of the first lens element is R1, a curvature radius of the image-side surface of the second lens element is R4, and the following condition is satisfied:

$6.0<(f/R1)+(f/R4)$.

9. The image capturing optical lens system of claim 1, wherein a focal length of the second lens element is f2, a focal length of the fourth lens element is f4, and the following condition is satisfied:

$0<f2/f4<1.25$.

10. The image capturing optical lens system of claim 1, wherein the focal length of the image capturing optical lens system is f, a maximum image height of the image capturing optical lens system is ImgH, and the following condition is satisfied:

$4.0<f/ImgH$.

11. The image capturing optical lens system of claim 1, further comprising:
at least one reflective element.

12. The image capturing optical lens system of claim 11, wherein the reflective element is located on an object side of the first lens element along the optical path, the reflective element has refractive power, and one surface of the reflective element facing towards an imaged object is convex in a paraxial region thereof.

13. The image capturing optical lens system of claim 11, wherein the reflective element is made of plastic material, a glass transition temperature of a material of the reflective element is Tgp, a refractive index of the reflective element is Np, and the following condition is satisfied:

$92.5<Tgp/Np<100$.

14. An imaging apparatus, comprising:
the image capturing optical lens system of claim 1; and
an image sensor disposed on the image surface of the image capturing optical lens system.

15. An electronic device, comprising:
the imaging apparatus of claim 14.

16. An image capturing optical lens system comprising four lens elements, the four lens elements being, in order from an object side to an image side along an optical path:
a first lens element, a second lens element, a third lens element and a fourth lens element;
wherein the second lens element has an image-side surface being concave in a paraxial region thereof;
the third lens element has an object-side surface being convex in a paraxial region thereof;
wherein an Abbe number of the second lens element is V2, an Abbe number of the third lens element is V3, a focal length of the image capturing optical lens system is f, a curvature radius of the object-side surface of the third lens element is R5, a curvature radius of an image-side surface of the third lens element is R6, a curvature radius of an object-side surface of the fourth lens element is R7, a curvature radius of an image-side surface of the fourth lens element is R8, an axial distance between an object-side surface of the first lens element and the image-side surface of the fourth lens element is Td, an axial distance between the image-side surface of the fourth lens element and an image surface is BL, a sum of all axial distances between adjacent lens elements of the image capturing optical lens system is ΣAT, an axial distance between the second lens element and the third lens element is T23, and the following conditions are satisfied:

10<V2+V3<55;

f/|R7|+f/|R8|<6.0;

0.5<Td/BL<2.4;

−10<(R5+R6)/(R5−R6)<−0.75; and 1.0<ΣAT/T23<1.8.

17. The image capturing optical lens system of claim 16, wherein the first lens element has positive refractive power; the second lens element has negative refractive power; the third lens element has positive refractive power; a maximum distance between an optical effective region of the object-side surface of the first lens element and the optical axis is Y11, a maximum image height of the image capturing optical lens system is ImgH, and the following condition is satisfied:

0.60<Y11/ImgH<1.20.

18. The image capturing optical lens system of claim 16, wherein the curvature radius of the object-side surface of the third lens element is R5, the curvature radius of the image-side surface of the third lens element is R6, and the following condition is satisfied:

−10<(R5+R6)/(R5−R6)≤−0.83.

19. The image capturing optical lens system of claim 16, wherein the focal length of the image capturing optical lens system is f, the curvature radius of the object-side surface of the fourth lens element is R7, the curvature radius of the image-side surface of the fourth lens element is R8, and the following condition is satisfied:

f/|R7|+f/|R8|<5.0.

20. The image capturing optical lens system of claim 16, wherein a maximum image height of the image capturing optical lens system is ImgH, an entrance pupil diameter of the image capturing optical lens system is EPD, and the following condition is satisfied:

0.30<ImgH/EPD<0.80.

21. The image capturing optical lens system of claim 16, wherein the fourth lens element has the image-side surface being concave in a paraxial region thereof and comprises at least one inflection point in an off-axis region thereof.

22. The image capturing optical lens system of claim 16, wherein the first lens element has the object-side surface being convex in a paraxial region thereof; the focal length of the image capturing optical lens system is f, a curvature radius of the object-side surface of the first lens element is R1, a curvature radius of the image-side surface of the second lens element is R4, and the following condition is satisfied:

6.0<(f/R1)+(f/R4).

23. The image capturing optical lens system of claim 16, wherein a half of a maximum field of view of the image capturing optical lens system is HFOV, and the following condition is satisfied:

tan(2×HFOV)<0.60.

24. An image capturing optical lens system comprising four lens elements, the four lens elements being, in order from an object side to an image side along an optical path:
a first lens element, a second lens element, a third lens element and a fourth lens element;
wherein the third lens element with positive refractive power has an object-side surface being convex in a paraxial region thereof and an image-side surface being concave in a paraxial region thereof;
the fourth lens element has negative refractive power;
wherein an Abbe number of the second lens element is V2, an Abbe number of the third lens element is V3, a focal length of the image capturing optical lens system is f, a curvature radius of an object-side surface of the fourth lens element is R7, a curvature radius of an image-side surface of the fourth lens element is R8, a central thickness of the first lens element is CT1, a central thickness of the second lens element is CT2, a sum of all axial distances between adjacent lens elements of the image capturing optical lens system is ΣAT, an axial distance between the second lens element and the third lens element is T23, an axial distance between an object-side surface of the first lens element and an image surface is TL, and the following conditions are satisfied:

10<V2+V3<55;

f/|R7|+f/|R8|<6.0;

0.30<CT1/CT2<2.7;

1.0<ΣAT/T23<2.5;

TL/f<1.40; and 0.19≤f2/f4<1.25.

25. The image capturing optical lens system of claim 24, wherein a maximum distance between an optical effective region of the object-side surface of the first lens element and the optical axis is Y11, a maximum image height of the image capturing optical lens system is ImgH, and the following condition is satisfied:

$0.60 < Y11/ImgH < 1.20$.

26. The image capturing optical lens system of claim 24, wherein a minimum Abbe number of the lens elements of the image capturing optical lens system is V min, and the following condition is satisfied:

$10 < V\ min < 20$.

27. The image capturing optical lens system of claim 24, wherein an axial distance between an object-side surface of the first lens element and the image-side surface of the fourth lens element is TD, an axial distance between the image-side surface of the fourth lens element and the image surface is BL, and the following condition is satisfied:

$0.5 < Td/BL < 4.0$.

28. The image capturing optical lens system of claim 24, wherein the focal length of the image capturing optical lens system is f, the axial distance between an object-side surface of the first lens element and the image surface is TL, and the following condition is satisfied:

$TL/f < 1.20$;

wherein an Abbe number of one of the lens elements is Vi, a refractive index of the lens element is Ni, and at least one of the lens elements of the image capturing optical lens system satisfies the following condition:

$5.0 < Vi/Ni < 12.0$, wherein $i = 1, 2, 3, 4$.

29. The image capturing optical lens system of claim 24, wherein the focal length of the image capturing optical lens system is f, a maximum image height of the image capturing optical lens system is ImgH, and the following condition is satisfied:

$4.0 < f/ImgH$.

30. The image capturing optical lens system of claim 24, further comprising:

a light blocking element having a non-circular inner hole.

* * * * *